United States Patent
Yoshida et al.

(10) Patent No.: US 10,003,406 B2
(45) Date of Patent: Jun. 19, 2018

(54) OPTICAL LEVEL CONTROL APPARATUS AND OPTICAL RECEPTION APPARATUS

(71) Applicant: FUJITSU LIMITED, Kawasaki-shi, Kanagawa (JP)

(72) Inventors: Setsuo Yoshida, Inagi (JP); Keisuke Harada, Fukuoka (JP)

(73) Assignee: FUJITSU LIMITED, Kawasaki (JP)

(*) Notice: Subject to any disclaimer, the term of this patent is extended or adjusted under 35 U.S.C. 154(b) by 70 days.

(21) Appl. No.: 14/501,499

(22) Filed: Sep. 30, 2014

(65) Prior Publication Data

US 2015/0117871 A1    Apr. 30, 2015

(30) Foreign Application Priority Data

Oct. 28, 2013   (JP) .................................. 2013-223231

(51) Int. Cl.
H04B 10/06     (2006.01)
H04B 10/293    (2013.01)
H04B 10/272    (2013.01)
H04B 10/291    (2013.01)

(52) U.S. Cl.
CPC ......... H04B 10/293 (2013.01); H04B 10/272 (2013.01); H04B 10/2914 (2013.01)

(58) Field of Classification Search
None
See application file for complete search history.

(56) References Cited

U.S. PATENT DOCUMENTS

| 4,868,809 A | * | 9/1989 | Kahn | H04L 12/423 398/154 |
| 5,570,227 A | * | 10/1996 | Nabeyama | H01S 3/1301 359/337 |
| 6,118,576 A | * | 9/2000 | Sugiya | H01S 3/06758 359/341.33 |

(Continued)

FOREIGN PATENT DOCUMENTS

| JP | 8-179388 | 7/1996 |
| JP | 2001-144552 | 5/2001 |
| JP | 2009-165166 | 7/2009 |

OTHER PUBLICATIONS

Ossieur et al., "Demonstration of a 32×512 Split, 100 km Reach, 2×32×10 Gb/s Hybrid DWDM-TDMA PON Using Tunable External Cavity Lasers in the ONUs", *Journal of Lightwave Technology*, Dec. 15, 2011, pp. 3705-3718, vol. 29, No. 24.

Primary Examiner — Ken N Vanderpuye
Assistant Examiner — David Lambert
(74) Attorney, Agent, or Firm — Staas & Halsey LLP

(57) ABSTRACT

An optical level control apparatus includes an input port, an output port, an optical device to assume a state of outputting light inputted to the input port from the output port and a state of not outputting the light inputted to the input port from the output port; a detector to detect an intensity of the light inputted to the input port, and a control unit to detect an input of an optical burst signal to the input port on the basis of a result of detecting the intensity of the light and to control the optical device so that the signal, in which to eliminate a field extending up to an elapse of a period of first time equal to or shorter than laser ON time period of the signal from a head of the signal with its input being detected, is output from the output port.

6 Claims, 31 Drawing Sheets

(56) References Cited

U.S. PATENT DOCUMENTS

| | | | |
|---|---|---|---|
| 6,366,393 B1* | 4/2002 | Feulner | H01S 3/1301 359/337 |
| 7,130,537 B1* | 10/2006 | Maxham | H04B 10/077 398/157 |
| 2007/0183793 A1* | 8/2007 | Zhao | H04B 10/66 398/212 |
| 2012/0163830 A1* | 6/2012 | Lee | H04B 10/2972 398/180 |
| 2012/0176667 A1* | 7/2012 | He | H04B 10/2942 359/344 |
| 2013/0028599 A1* | 1/2013 | Sone | H04J 14/0282 398/37 |

* cited by examiner

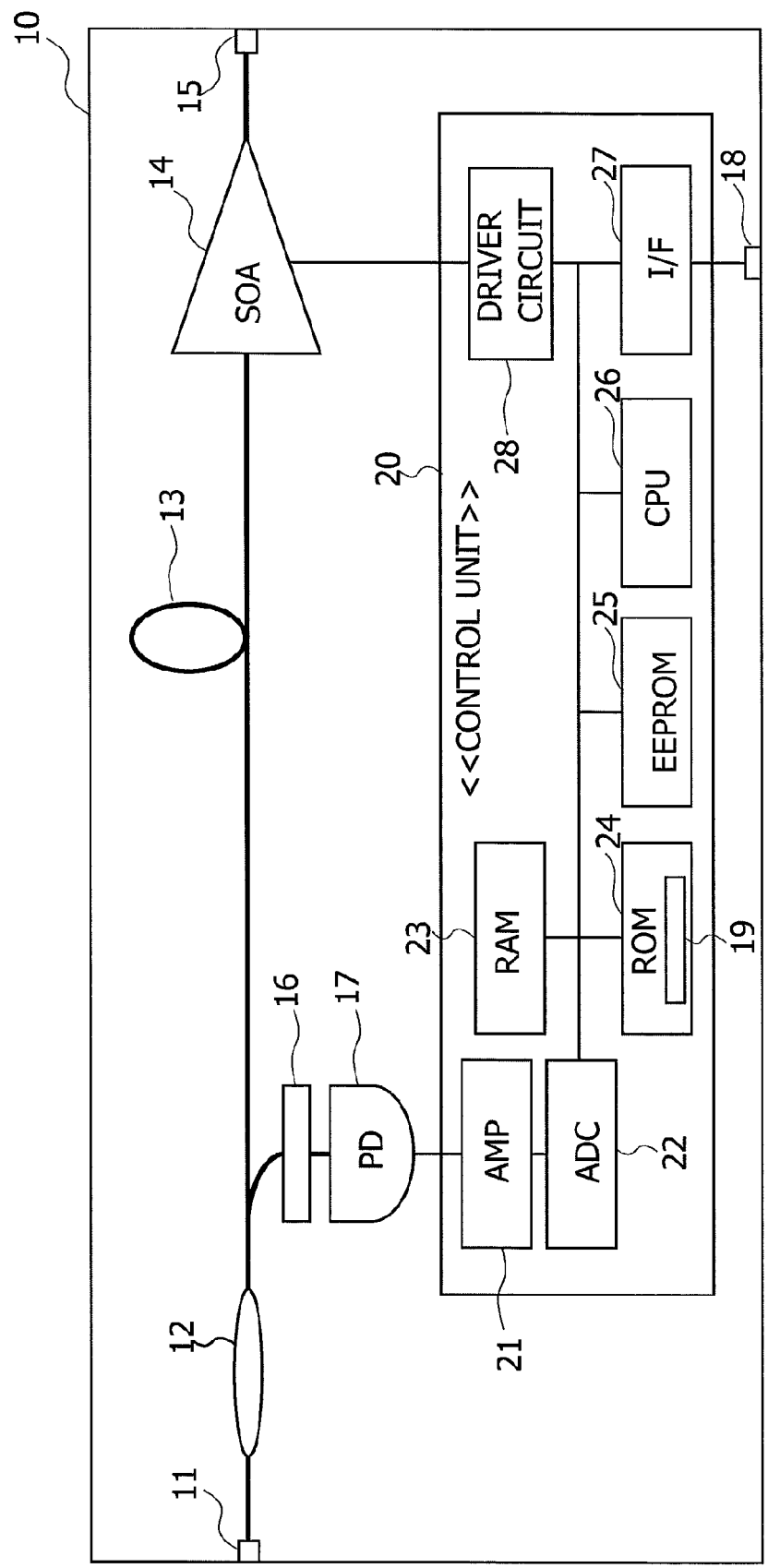

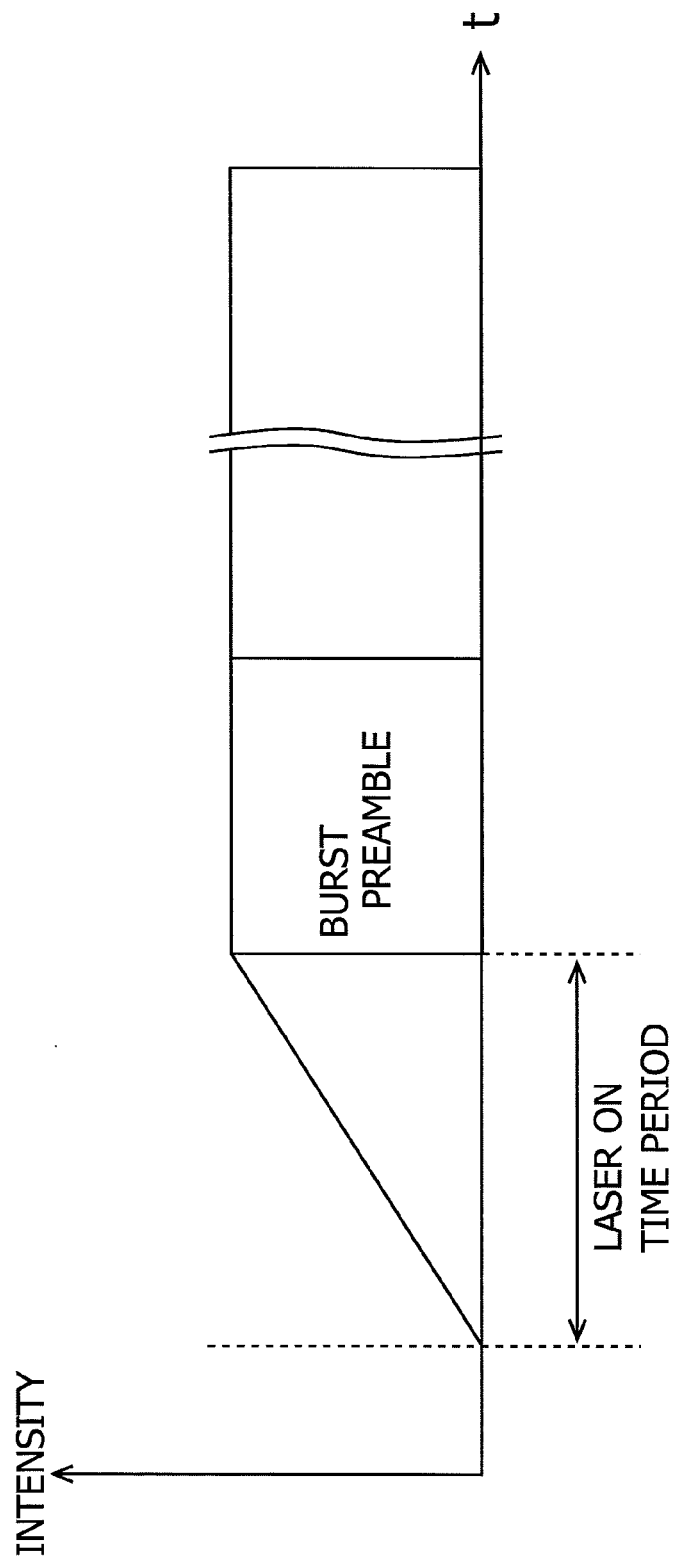

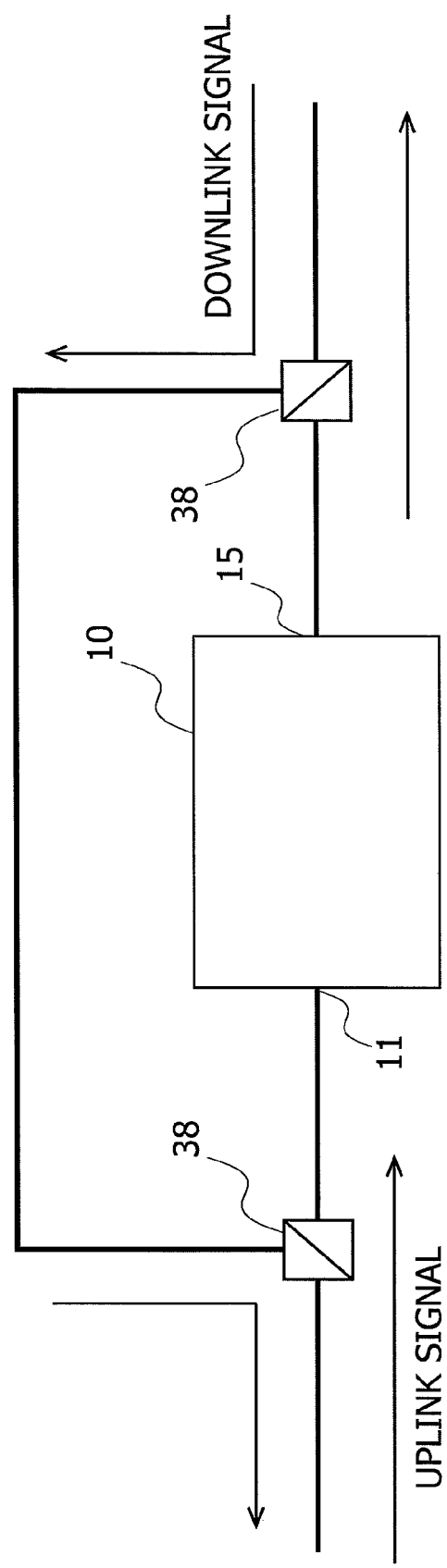

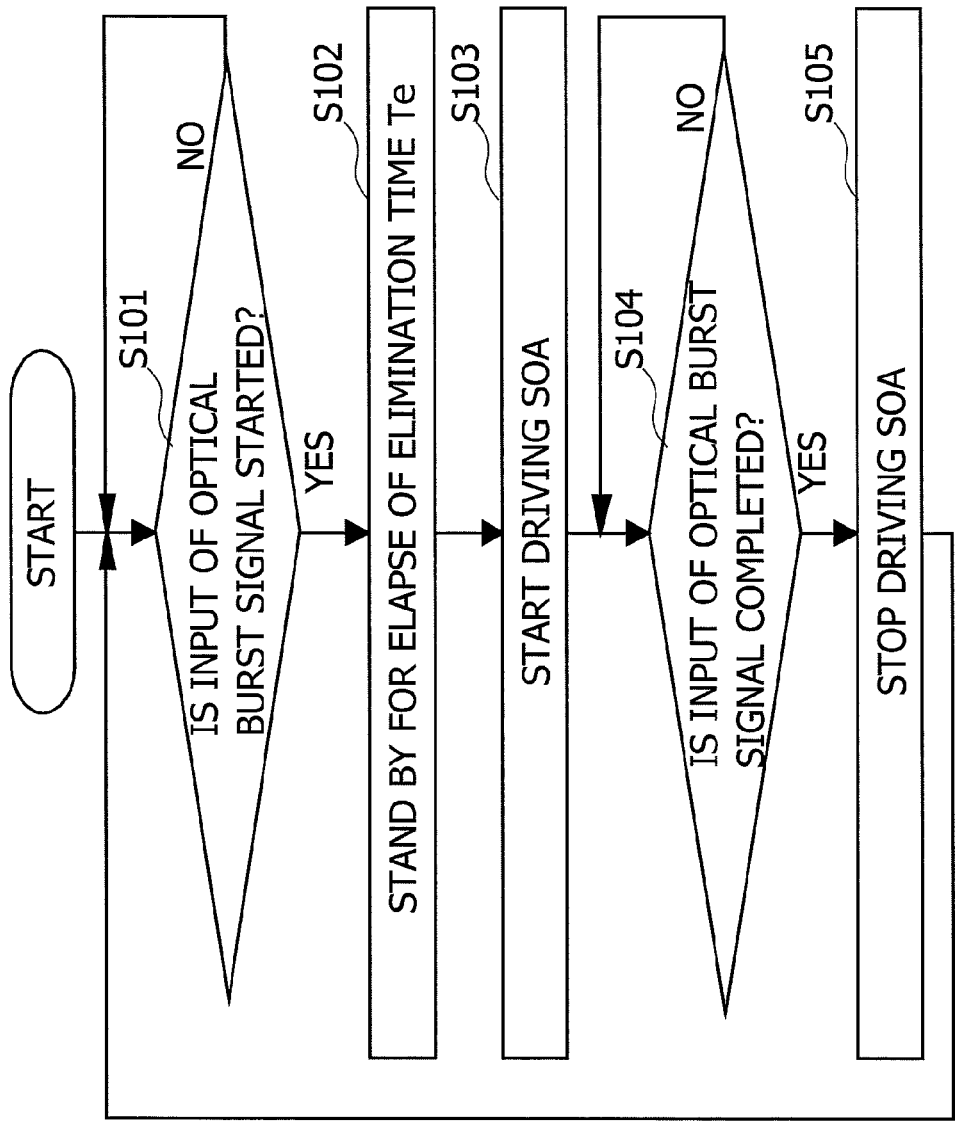

FIG.14

| ONU_ID | Te | Flag |
|---|---|---|
| ID_1 | Te[ID_1] | 0/1 |
| ID_2 | Te[ID_2] | 0/1 |
| ID_3 | Te[ID_3] | 0/1 |
| ID_4 | Te[ID_4] | 0/1 |

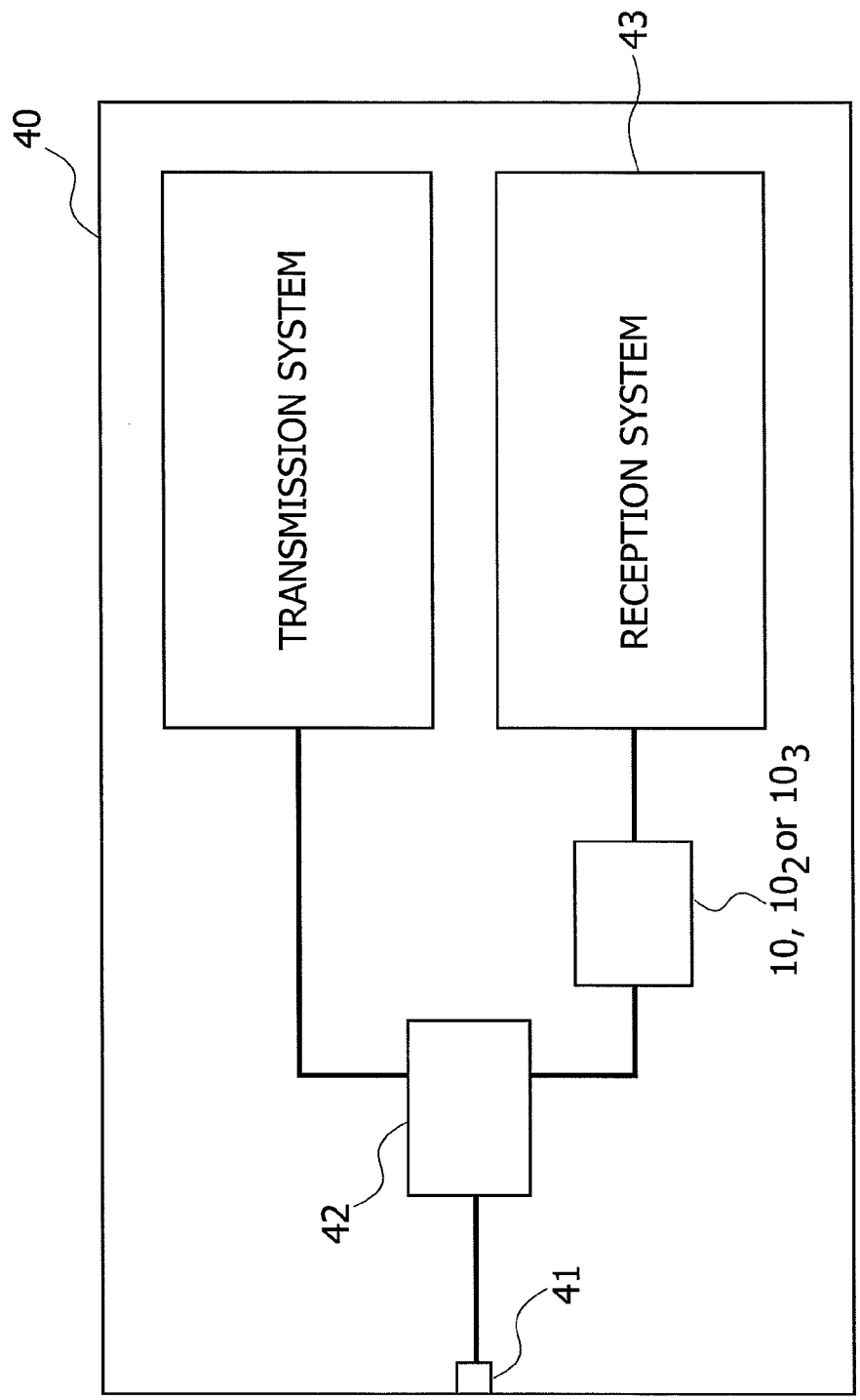

10,003,406 B2

OPTICAL LEVEL CONTROL APPARATUS AND OPTICAL RECEPTION APPARATUS

CROSS-REFERENCE TO RELATED APPLICATION

This application is based upon and claims the benefit of priority of the prior Japanese Patent Application No. 2013-223231, filed on Oct. 28, 2013, the entire contents of which are incorporated herein by reference.

FIELD

The embodiments discussed herein are related to an optical level control apparatus and an optical reception apparatus.

BACKGROUND

A Gigabit Ethernet Passive Optical Network (GE-PON, Ethernet being a registered trademark of Fuji Zerox Co., Ltd.) is utilized as a system for Fiber To The Home (FTTH).

The GE-PON system is a system shared between a plurality of Optical Network Units (ONUs) installed in a plurality of user's homes by diverging one single optical fiber extending from an Optical Line Terminal (OLT) installed in a center station by use of optical couplers.

The optical coupler is an element that is comparatively low in cost but does not require maintenance. Accordingly, the GE-PON system can be built up and operated at the low cost but has a limit in terms of a distance at which an optical burst signal can be transmitted and received without being amplified. It is therefore considered for enabling a long distance transmission to provide an optical fiber amplifier for amplifying the optical burst signal midway of an optical fiber of the GE-PON system.

However, a Time Division Multiple Access (TDMA) technology is used for an uplink (ONU→OLT) communication in the GE-PON system. Namely, the optical burst signal (burst (intermittent and discontinuous) optical signal) is transmitted from the ONU, then multiplexed by an optical coupler and transmitted to the OLT.

Then, the optical fiber amplifier is an amplifier configured to operate, if the light is continuously inputted, in a gain-saturated state and to recover the gain when the light ceases from being inputted (the gain is larger than the gain when saturated) (refer to, e.g., Non-Patent document 1).

Therefore, in the case of providing the optical fiber amplifier midway of the optical fiber of the GE-PON system, it follows that an optical surge is superposed on a head field of the optical burst signal. Then, the optical surge superposed on the head field of the optical burst signal causes a fault and deterioration of a unit (mainly an Avalanche Photo Diode (APD) that processes a reception signal in the OLT.

Accordingly, in the case of providing the optical fiber amplifier midway of the optical fiber of the GE-PON system, it is desirable to eliminate the optical surge superposed on the head field of the optical burst signal.

DOCUMENT OF RELATED ART

Patent Document

[Patent document 1] Japanese Laid-Open Patent Publication No. 08-179388

Non-Patent Document

[Non-Patent document 1] IEEE J. Lightwave Technol., vol. 29, no. 24, pp. 3705-3718, December 2011.

SUMMARY

An optical level control apparatus according to one aspect of a technology of the disclosure includes:
an input port;
an output port;
an optical device configured to assume a state of outputting light inputted to the input port from the output port and a state of not outputting the light inputted to the input port from the output port;
a detector configured to detect an intensity of the light inputted to the input port; and
a control unit configured to detect an input of an optical burst signal to the input port on the basis of a result of detecting the intensity of the light by the detector and to control the optical device so that the optical burst signal, in which to eliminate a field extending up to an elapse of a period of first time equal to or shorter than laser ON time period indicating a period of time till starting modulation of the optical burst signal from a head of the optical burst signal with its input being detected, is output from the output port.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 1 is an explanatory diagram of a hardware configuration of an optical level control apparatus according to a first embodiment;

FIG. 3 is an explanatory diagram of laser ON time period;

FIG. 5A is an explanatory diagram of a method of incorporating the optical level control apparatus according to the first embodiment into the optical communication system illustrated in FIGS. 2A-2B;

FIG. 6 is a flowchart of an optical level control process executed by a CPU in the optical level control apparatus according to the first embodiment;

FIG. 14 is an explanatory diagram of an elimination time management table retained within the optical level control apparatus according to the second embodiment;

FIG. 27 is a diagram of a configuration of the OLT realized by using the optical level control apparatus according to each of the embodiments.

DESCRIPTION OF EMBODIMENTS

Figure 2A:
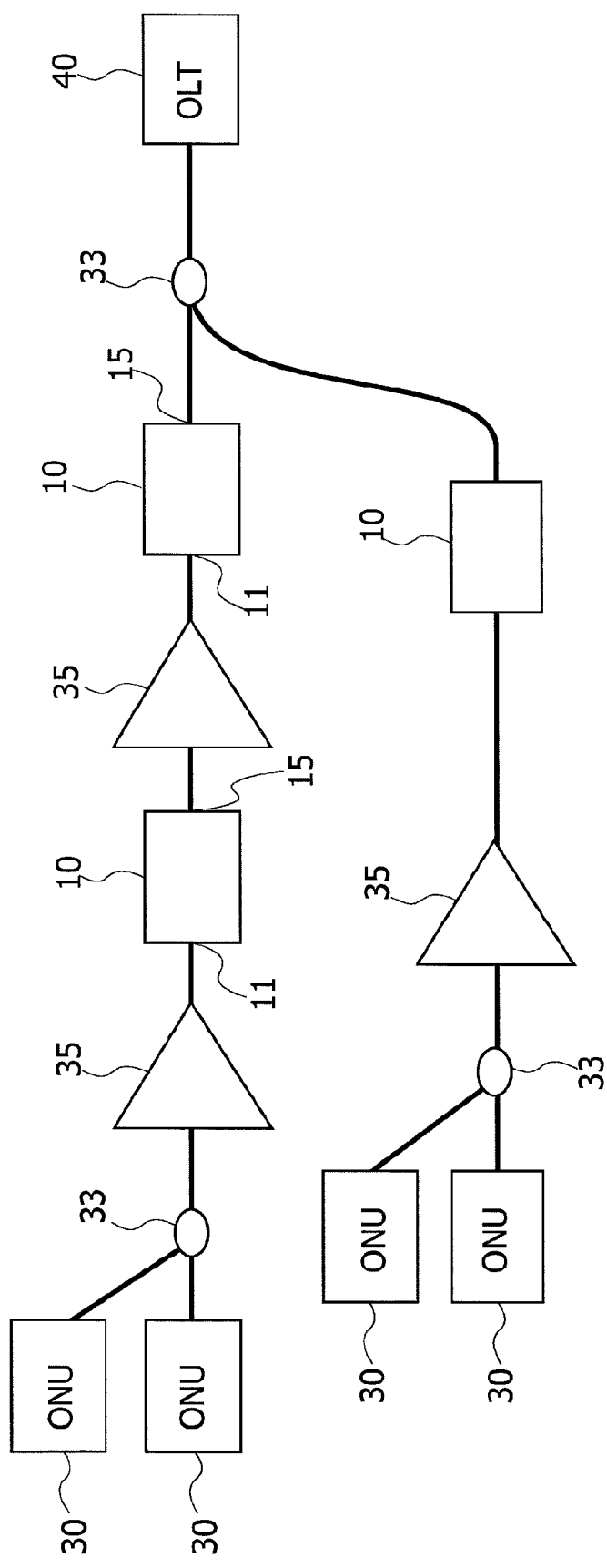
FIG. 2A is an explanatory diagram of an example of a configuration of an optical communication system that can be built up by use of the optical level control apparatus according to the first embodiment.

It is considered as a method of eliminating the optical surge superposed on the head field of the optical burst signal to supply dummy light at all times to the optical fiber amplifier and to perform feedback-control of the optical fiber amplifier so that the gain takes a fixed value.

If contrived to supply the dummy light at all times to the optical fiber amplifier, however, it follows that a wavelength resource usable for the communications is reduced. Further, an intensity of the optical burst signal, in which the optical surge is superposed on the head field, varies largely within a short period of time. It is therefore highly difficult to perform the feedback-control of the optical fiber amplifier so that the gain takes the fixed value.

In-depth descriptions of embodiments will hereinafter be made with reference to the drawings. It is to be noted that configurations of the following embodiments are exemplifications, and the apparatus is not limited to the configurations of the embodiments.

First Embodiment

FIG. 1 illustrates a hardware configuration of an optical level control apparatus 10 according to a first embodiment.

The optical level control apparatus 10 according to the first embodiment is an apparatus used as a component of an optical communication system in which optical burst signals are amplified by an optical fiber amplifier and thus transmitted. As illustrated in FIG. 1, the optical level control apparatus 10 includes an input port 11, an optical coupler 12, a delay line 13, a Semiconductor Optical Amplifier (SOA) 14 and an output port 15. Further, the optical level control apparatus 10 includes also the optical coupler 12, an optical filter 16, a Photo Diode (PD) 17, a setting port 18 and a control unit 20.

Before describing details of respective components of the optical level control apparatus 10, the optical communication system configured by use of the optical level control apparatus 10 is to be explained.

Figure 2B:
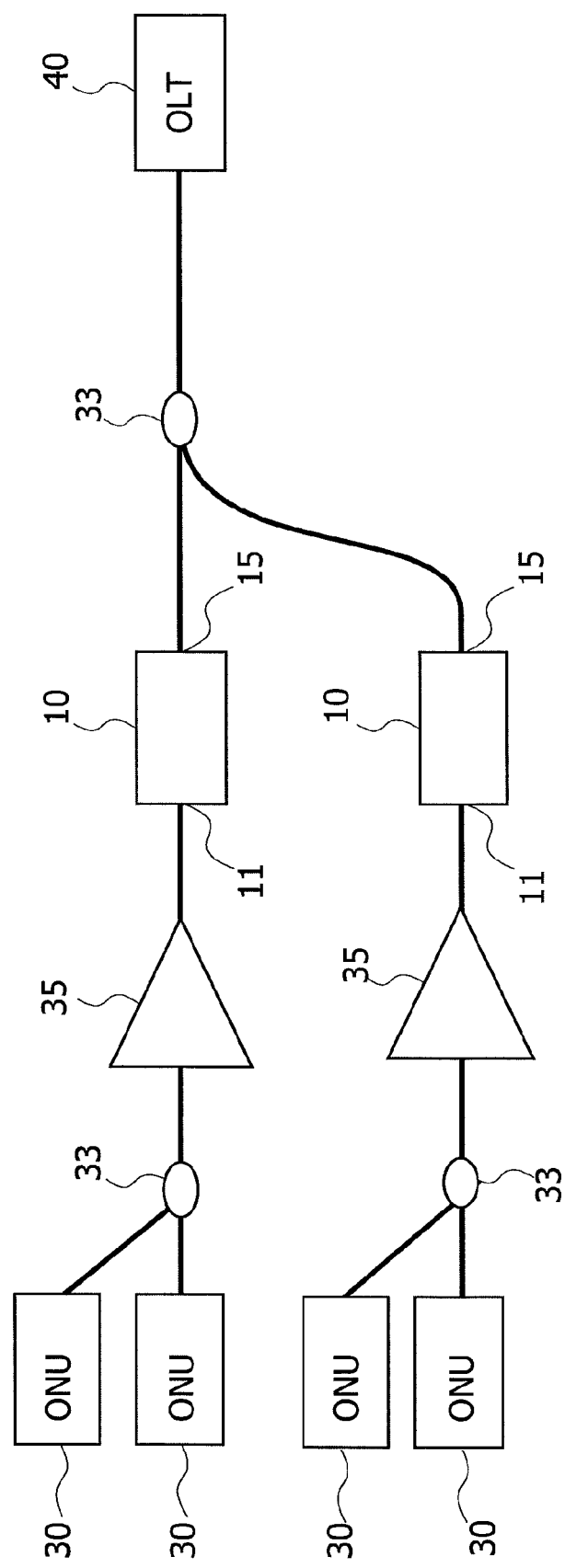
FIG. 2B is an explanatory diagram of an example of the configuration of the optical communication system that can be built up by use of the optical level control apparatus according to the first embodiment.
Figure 2C:
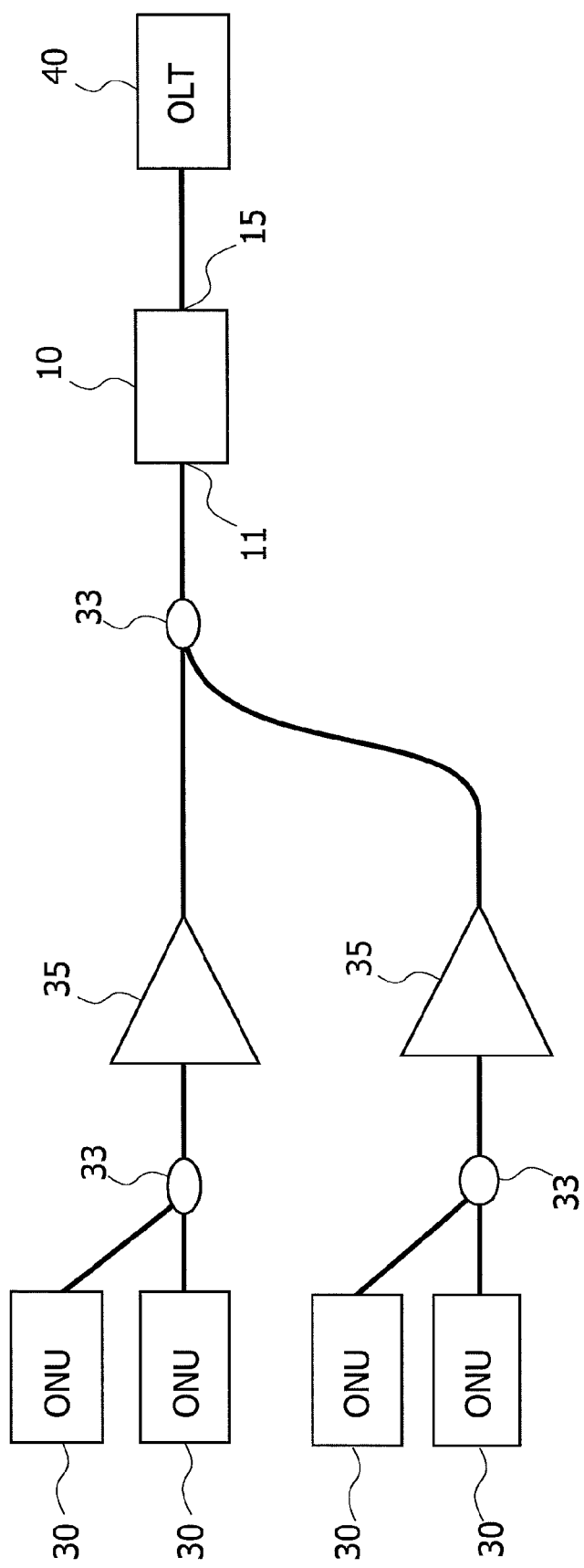
FIG. 2C is an explanatory diagram of an example of the configuration of the optical communication system that can be built up by use of the optical level control apparatus according to the first embodiment.

"The optical communication system in which the optical burst signals are amplified by the optical fiber amplifier and thus transmitted", the system being configured by use of the optical level control apparatus 10, is a system having configurations as, e.g., illustrated in FIGS. 2A-2C.

Each of the optical communication systems depicted in FIGS. 2A-2C is a system with some number of optical fiber amplifiers (which will hereinafter be also abbreviated to FA (Fiber Amplifier)) 35 added to a GE-PON system, the FA 35 serving to amplify uplink optical signals.

To be specific, each of the optical communication systems illustrated in FIGS. 2A-2C is a system configured such that the optical burst signals transmitted by respective ONUs 30 are multiplied by the optical couplers 33 and are, after being concurrently amplified by some number of FAs 35, transmitted to the OLT 40. Further, each optical communication system is a system configured such that the respective ONUs 30 transmit the optical burst signals with laser ON time period being 512 ns. Herein, the "laser ON time period" connotes a period of time till an output of a laser diode is modulated since switching ON a laser diode for transmitting the optical burst signal within the ONU 30, the laser diode being normally switched OFF. In other words, the "laser ON time period" connotes a length (continuation time) of an unmodulated field existing before a body field (a modulated field subsequent to "Burst Preamble") of the optical burst signal of which an intensity varies timewise as schematically illustrated in FIG. 3.

Then, in the optical communication system described above, as illustrated in FIGS. 2A-2C, the optical level control apparatus 10 is the apparatus used in the way of being inserted into a path along which the optical burst signal amplified by the FA 35 passes so that the optical burst signal is inputted to the input port 11.

Figure 4:
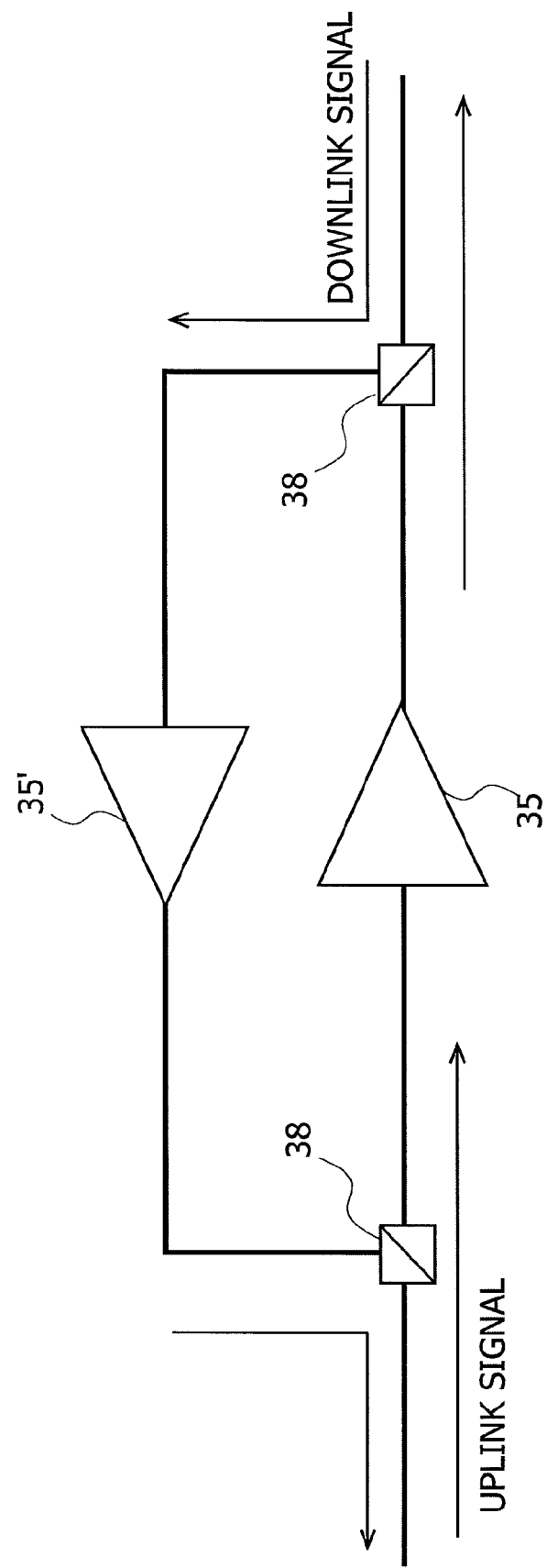
FIG. 4 is an explanatory diagram of a configuration related to a downlink signal in the optical communication system illustrated in FIGS. 2A-2B.

Note that each of the optical communication systems depicted in FIGS. 2A-2C is the system (i.e., the system configured to transmit an uplink optical signal and a downlink optical signal via a single optical fiber) into which the GE-PON system is modified. Accordingly, an FA 35' for amplifying the downlink signal (the optical signal in a downlink) is provided in the vicinity of each FA 35 in the form as depicted in, e.g., FIG. 4 in each optical communication system. Namely, a Wavelength Division Multiplexing (WDM) coupler 38 for supplying the downlink optical signal to the FA 35' and supplying the optical signal toward the OLT 40 from the FA 35, is provided on the side (a right side in FIG. 4) of the OLT 40 of each FA 35 within each optical communication system. Further another WDM coupler 38 for supplying the optical signal amplified by the FA 35' toward the ONU 30 and supplying the uplink signal (the optical signal in an uplink) to the FA 35, is provided on the side (a left side in FIG. 4) of the ONU 30 of each FA 35.

Furthermore, the optical level control apparatus 10 is configured as the system used in the form of the downlink optical signal not being inputted from the output port 15 (see FIG. 1). Therefore, the optical level control apparatus 10 is, if used as the component of each of the optical communication systems as illustrated in FIGS. 2A-2C, incorporated into the optical communication system in the forms as depicted in FIGS. 5A and 5B.

Figure 5B:
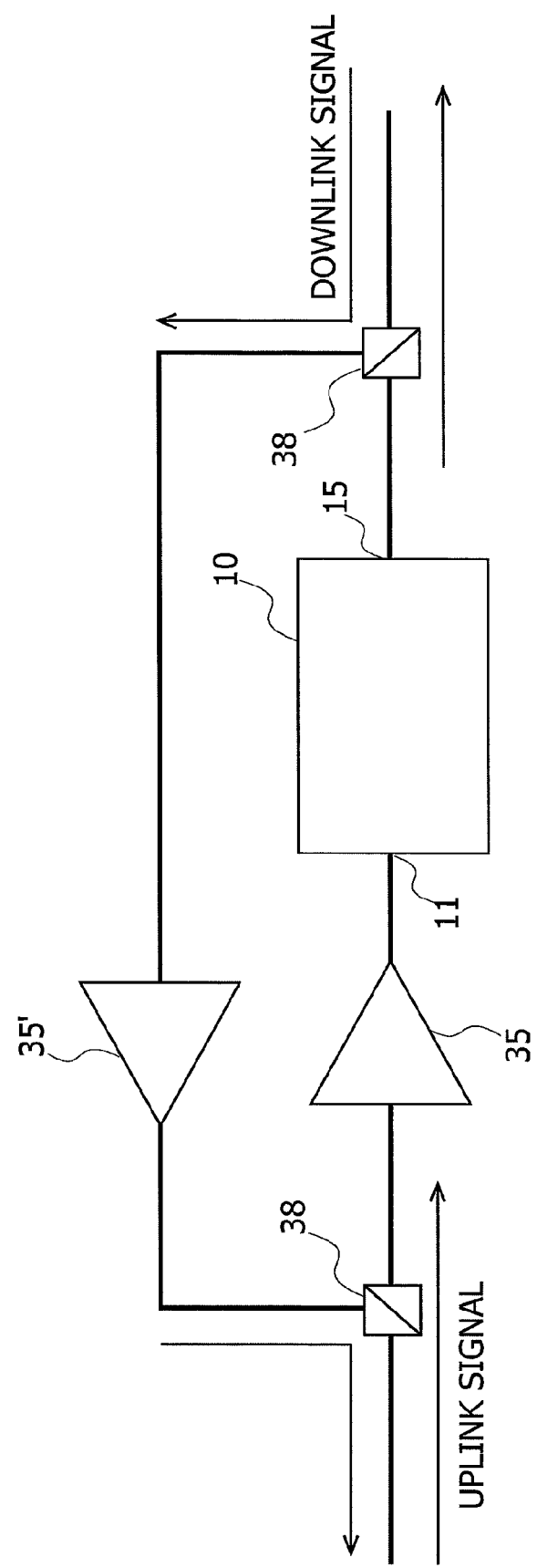
FIG. 5B is an explanatory diagram of a configuration related to the downlink signal in the optical communication system illustrated in FIGS. 2A-2B.

Namely, the optical level control apparatus 10 is, for example, as illustrated in FIG. 5A, incorporated into the optical communication system together with an optical circuit (including the two WDM couplers 38 and the optical fiber for connecting these couplers) for inhibiting the downlink optical signal from passing through within the optical level control apparatus 10. Moreover, for instance, as depicted in FIG. 5B, the optical level control apparatus 10 is incorporated into the optical communication system in the form of being inserted in between the FA 35 and the WDM coupler 38 (see FIG. 4) for supplying the downlink optical signal to the FA 35' and supplying the optical signal toward the OLT 40 from the FA 35. Note that the configuration of incorporating the optical level control apparatus 10 into the optical communication system in the form depicted in FIG. 5A is normally applied to a case of the optical coupler 33 existing at a front stage (on the side of the ONU 30) (see FIG. 2C) and a case of there being a long distance from the FA 35 existing at the front stage.

Referring back to FIG. 1, the respective components of the optical level control apparatus 10 will be described.

The optical coupler 12 equipped in the optical level control apparatus 10 is an optical coupler (optical splitter) that diverges some amount (e.g., 1%) of the light inputted to the input port 11 toward the optical filter 16. The optical filter 16 is an optical bandpass filter that transmits the optical burst signal (precisely, the light having a specified wave range) but cuts Amplified Spontaneous Emission (ASE) of the FA 35. A PD 17 is a photoelectric converting element for measuring an intensity of the light penetrating the optical filter 16.

The delay line 13 is an optical fiber provided within the optical level control apparatus 10 in order to delay input timing of the optical burst signal to the SOA 14 (an in-depth description thereof will be made later on).

The SOA 14 is a normal type of semiconductor optical amplifier capable of amplifying the optical signal. The SOA 14 in the optical level control apparatus 10 is, however, used as an ON-OFF switch for the optical signal, i.e., "a device enabled to assume a state of amplifying the inputted light with a preset fixed gain and outputting the amplified light and also a state of not outputting the inputted light" (details thereof will be described later on).

The control unit 20 is an Application Specific Integrated Circuit (ASIC) developed for the optical level control apparatus 10.

As illustrated in FIG. 1, the control unit 20 includes an amplifier ("AMP") 21, an analog-digital converting circuit ("ADC") 22, a Random Access Memory (RAM) 23 and a flash Read Only Memory (ROM in FIG. 1) 24. The control unit 20 further includes an Electrically Erasable Programmable ROM (EEPROM) 25, a Central Processing Unit (CPU) 26, an interface circuit (I/F) 27 and a driver circuit 28.

The AMP 21 is an analog amplifier for amplifying the output of the PD 17. The ADC 22 is a circuit for converting an output of the AMP 21 into a digital signal. The driver circuit 28 is a circuit for supplying a drive current to the SOA 14, a quantity of which is designated by the CPU 26.

The interface circuit 27 is a circuit for performing communications with a computer connected to the setting port 18.

The flash ROM 24 is a nonvolatile memory that retains a program (firmware) 19 to be read onto the RAM 23 and executed by the CPU 26. The EEPROM 25 is a nonvolatile memory for storing a default value (e.g., 200 ns) of elimination time Te etc.

The RAM 23 is a memory configured such that a part of storage area is used as a storage area for the program 19 executed by the CPU 26, while the remaining storage area is used as a temporary storage area for various items of data. The CPU 26 is a unit that controls the respective units within the optical level control apparatus 10 according to the program 19 in an integrated manner.

A configuration and functions of the optical level control apparatus 10 will hereinafter be tangibly described based on what has been discussed so far by way of a premise.

The CPU 26 starts, upon power-on of the optical level control apparatus 10, reading the program 19 stored on the flash ROM 24 onto the RAM 23 and executing the program 19. The CPU 26, which has started executing the program 19, at first reads the elimination time Te stored on the EEPROM 25 onto the RAM 23. Then, the CPU 26 initiates an optical level control process and a setting acceptance process.

The setting acceptance process implemented by the CPU 26 is a process of monitoring whether an instruction of changing the elimination time Te is inputted via the setting port 18 and changing, when the change instruction is inputted, a Te value on the RAM 23 and on the EEPROM 25 to an instructed value. Note that, as will be described in detail later, an event of changing the value of the elimination time Te is generally applied to a case where the OLT 40 does not normally receive the optical burst signal with the default value of the elimination time Te.

The optical level control process implemented by the CPU 26 is a process of a procedure illustrated in FIG. 6.

Namely, the CPU 26 starting this optical level control process, to begin with, in step S101, comes to a state of monitoring that the optical burst signal starts being inputted to the input port 11 on the basis of an output of the PD 17. More specifically, the CPU 26 becomes a state of repeating a process (step S101) of determining, based on a result of the AD conversion by the ADC 22, whether or not the optical burst signal of the output of the PD 17 starts being inputted to the optical level control apparatus 10, the output being amplified by the AMP 21.

The CPU 26, when detecting that the optical burst signal starts being inputted to the optical level control apparatus 10 (step S101; YES), stands by for an elapse of the elimination time Te in step S102. Then, the CPU 26, when the elimination time Te has elapsed since detecting that the optical burst signal started being inputted, starts driving the SOA 14 (step S103).

Herein, the phrase "starts driving the SOA 14" connotes "controlling the driver circuit 28 so as to continue outputting the drive current by which the SOA 14 operates in a state of amplifying the inputted light with the preset fixed gain and outputting the amplified light."

Figure 7:
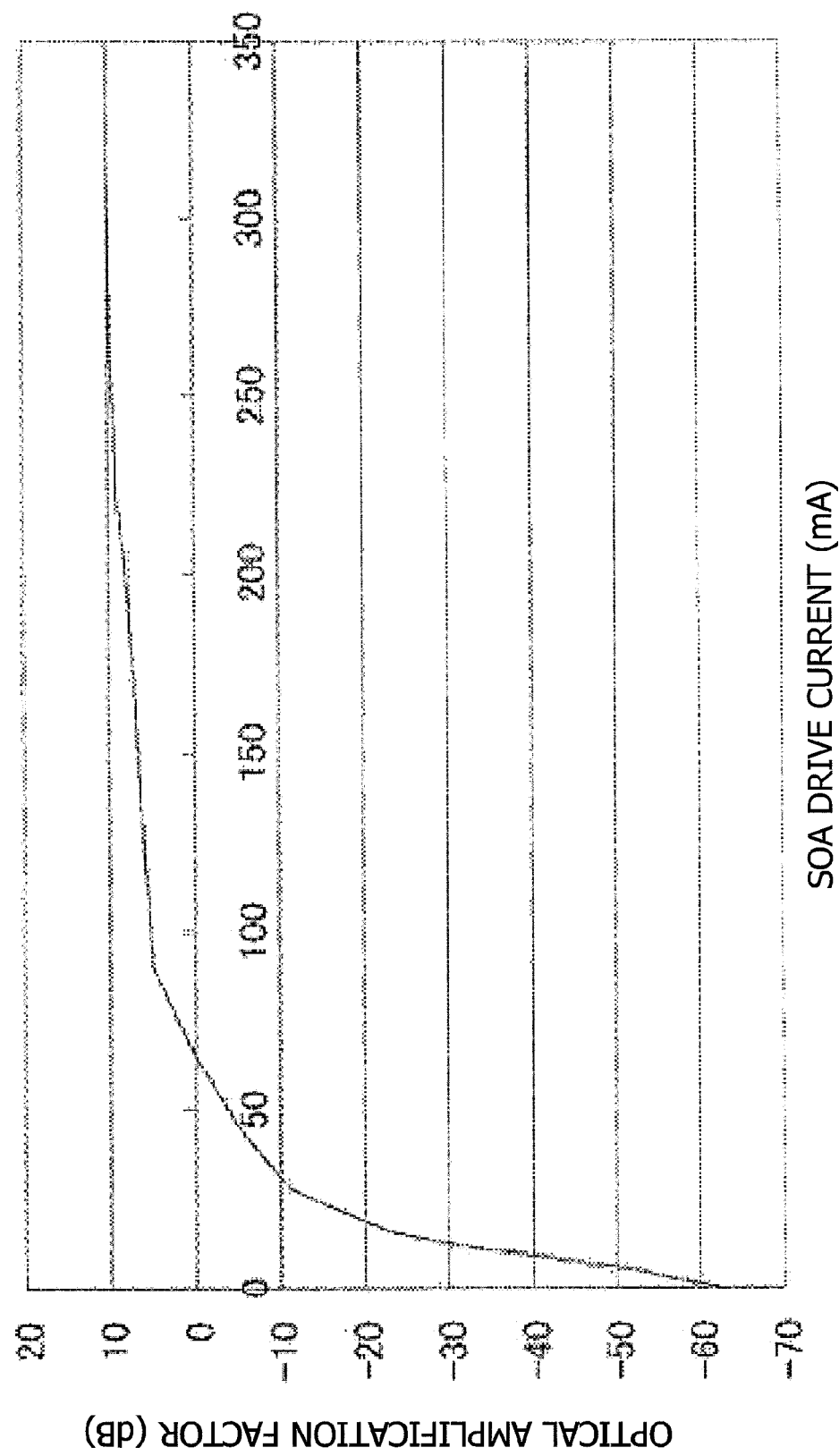
FIG. 7 is a graph indicating a relationship between an optical amplification factor and a drive current of an SOA in the optical level control apparatus according to the first embodiment.

Concretely, the SOA 14 equipped in the optical level control apparatus 10 is configured to vary an amplification factor corresponding to the drive current as depicted in FIG. 7. Namely, the SOA 14, if the drive current takes a certain value (about 65 mA), operates in "the state of amplifying the inputted light with the preset fixed gain and outputting the amplified light" (a state where the optical amplification factor becomes 0 dB). Accordingly, in step S103 (FIG. 6), the CPU 26 executes a process of controlling the driver circuit 28 so as to continue outputting the drive current taking the value described above.

The CPU 26 finishing the process in step S103 comes to a state of repeating a process (step S104) of determining, based on the output of the PD 17, whether the input of the optical burst signal is completed or not. Note that the process in step S104 is a process of determining that the input of the optical burst signal is completed when the output of the PD 17 starts decreasing (precisely, the output of the PD 17 is a result of the analog-digital conversion by the ADC 22 of the output of the PD 17 amplified by the AMP 21).

Then, the CPU 26, when detecting that the input of the optical burst signal is completed (step S104; YES), stops driving the SOA 14 (step S105). Herein, the phrase "stops driving the SOA 14" connotes "controlling the driver circuit 28 so as not to output the drive current (so as to output the drive current of 0 mA)". Note that the SOA 14, if setting the drive current to 0 mA, operates "in a state of attenuating the inputted light by 60 dB or larger". Therefore, when executing the process in step S105, it follows that the state of the SOA 14 transitions to "the state of attenuating the inputted light by 60 dB or larger", in other words, "a state of not outputting the inputted light".

The CPU 26 finishing the process in step S105 loops back to step S101 and monitors therein whether the next optical burst signal starts being inputted.

In short, this optical level control process (FIG. 6) is a process of controlling the SOA 14 so that the optical burst signal with an eliminated field of "elimination time Te" extending from the head of the optical burst signal inputted to the input port 11 is output from the output port 15.

However, the CPU 26 etc. within the control unit 20 is a unit that operates by clocks, and hence the process in each step requires a given period of time. Further, the transition of the state of the SOA 14 also requires, though very short (on the order of nano second), a period of time. Accordingly, if the optical coupler 12 is connected directly to the SOA 14, it follows that a field up to after "Te+α" time from the head of the optical burst signal inputted to the input port 11 is eliminated in the optical level control process having the content described above.

A scheme of providing the delay line 13 aims at enabling the optical level control process having the content described above to eliminate the field up to after the Te time from the head of the optical burst signal inputted to the input port 11. Namely, the delay line 13 involves a line having a length enabled to delay the input timing of the optical burst signal to the SOA 14 as long as the time "α" given in the description. Note that in the optical fiber having a length of 1 m, propagation time of the optical signal is approximately 5 ns. Then, even when the control unit 20 has low performance, normally a value "α" does not exceed 150 ns. Accordingly, the optical fiber having a length of about 30 m or shorter is used as the delay line 13.

As discussed so far, the optical level control apparatus 10 according to the first embodiment outputs, from the output port 15, the optical burst signal with the eliminated field corresponding to the elimination time Te extending from the head of the optical burst signal inputted to the input port 11.

Figure 8:
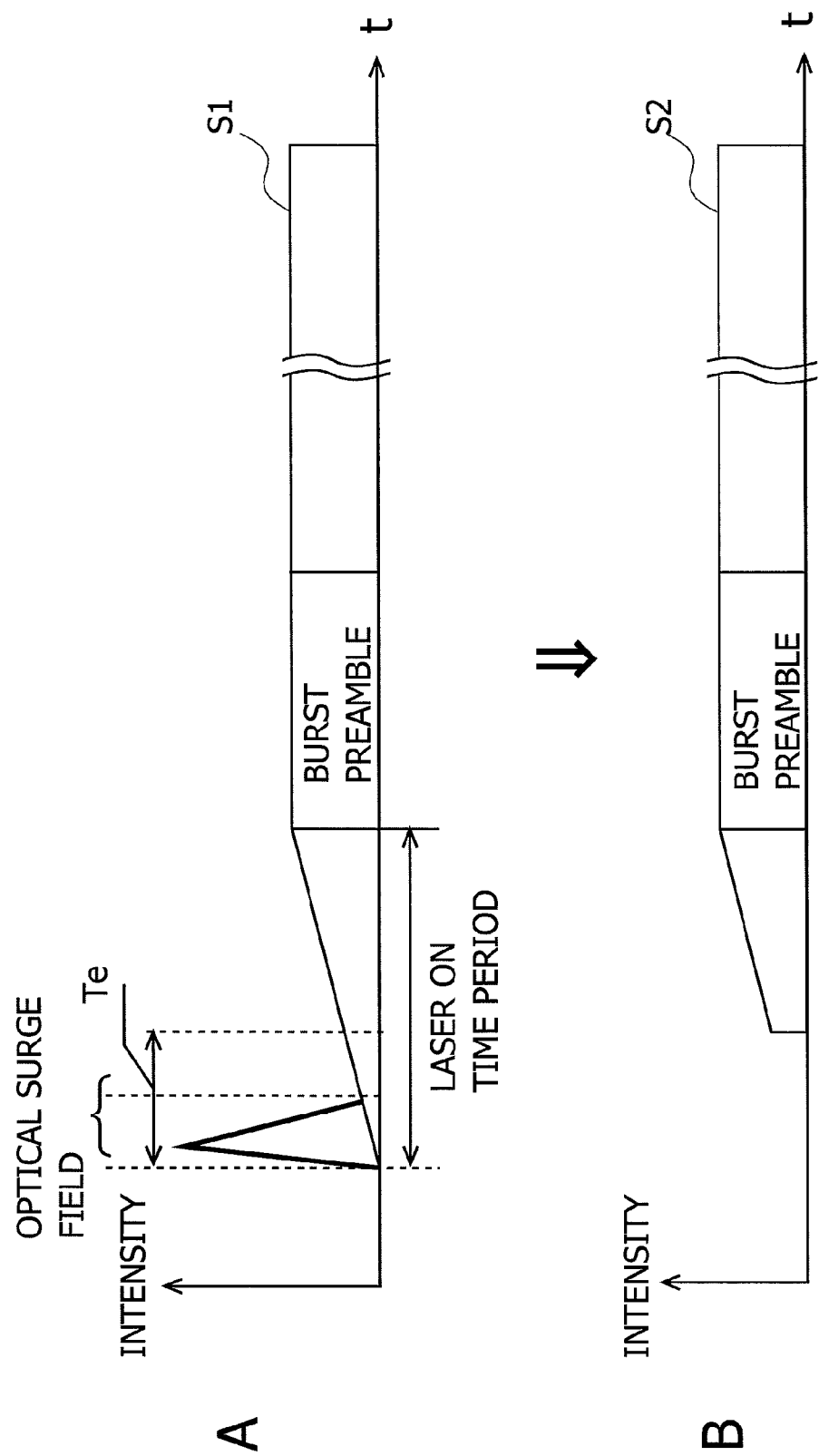
FIG. 8 is an explanatory diagram of functions of the optical level control apparatus according to the first embodiment.

Accordingly, for example, when an optical burst signal S1 taking a shape illustrated in FIG. 8A is inputted to the input port 11 of the optical level control apparatus 10, an optical burst signal S2 taking a shape illustrated in FIG. 8B is output from the output port 15. Note that an event of inputting the optical burst signal taking such a shape as in the case of the optical burst signal S1 (the optical burst signal containing a field corresponding to the laser ON time period before the body field) to the input port 11 of the optical level control apparatus 10, is applied to a case where no other optical level control apparatuses 10 exist at the front stage.

Then, if the FA 35 does not exist at a rear stage of the optical level control apparatus 10 (see FIGS. 2B and 2C), the optical burst signal S2 reaches the OLT 40 in a state where the intensity is attenuated to some extent. It therefore follows that the use of the optical level control apparatus 10 enables the optical communication system to be realized, in which a field overlapped with an optical surge (which will hereinafter be termed an optical surge field), the field existing in the original optical burst signal, does not adversely affect an optical burst signal processing unit within the OLT 40.

Figure 9:
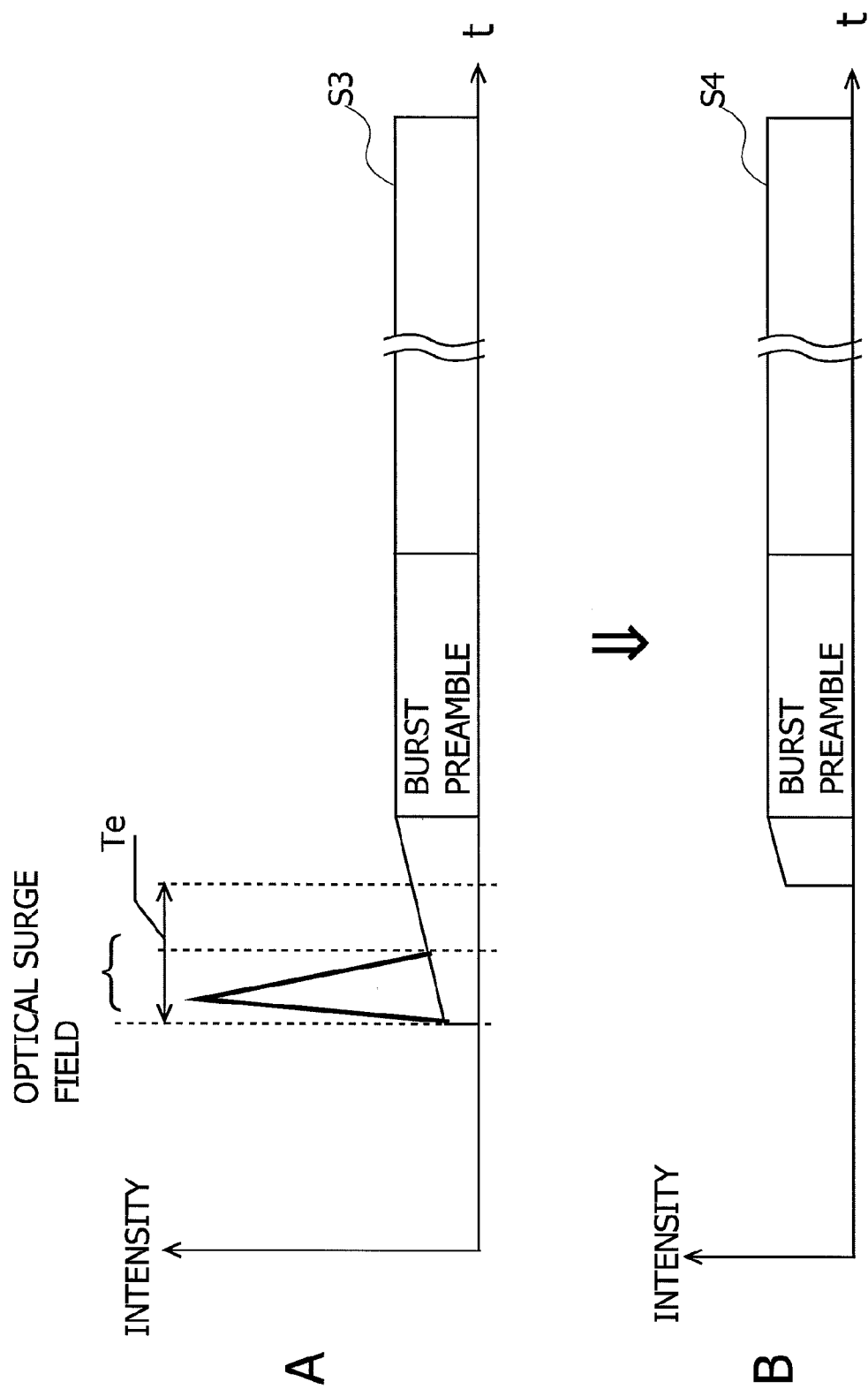
FIG. 9 is an explanatory diagram of the functions of the optical level control apparatus according to the first embodiment.

Further, when the optical burst signal S2 is amplified by the FA 35, the signal becomes an optical burst signal S3 as depicted in FIG. 9A. Then, when this optical burst signal S3 is inputted to the input port 11, an optical burst signal S4 taking a shape illustrated in FIG. 9B is output from the output port 15.

Accordingly, it follows that the optical level control apparatus 10 become an apparatus, which can be used also in the form depicted at an upper stage of FIG. 2A.

Moreover, the optical level control apparatus 10 monitors whether an instruction of changing the elimination time Te is inputted via the setting port 18 and to change, when the change instruction is inputted, the Te value on the RAM 23 and the EEPROM 25 to an indicated value.

Figure 10:
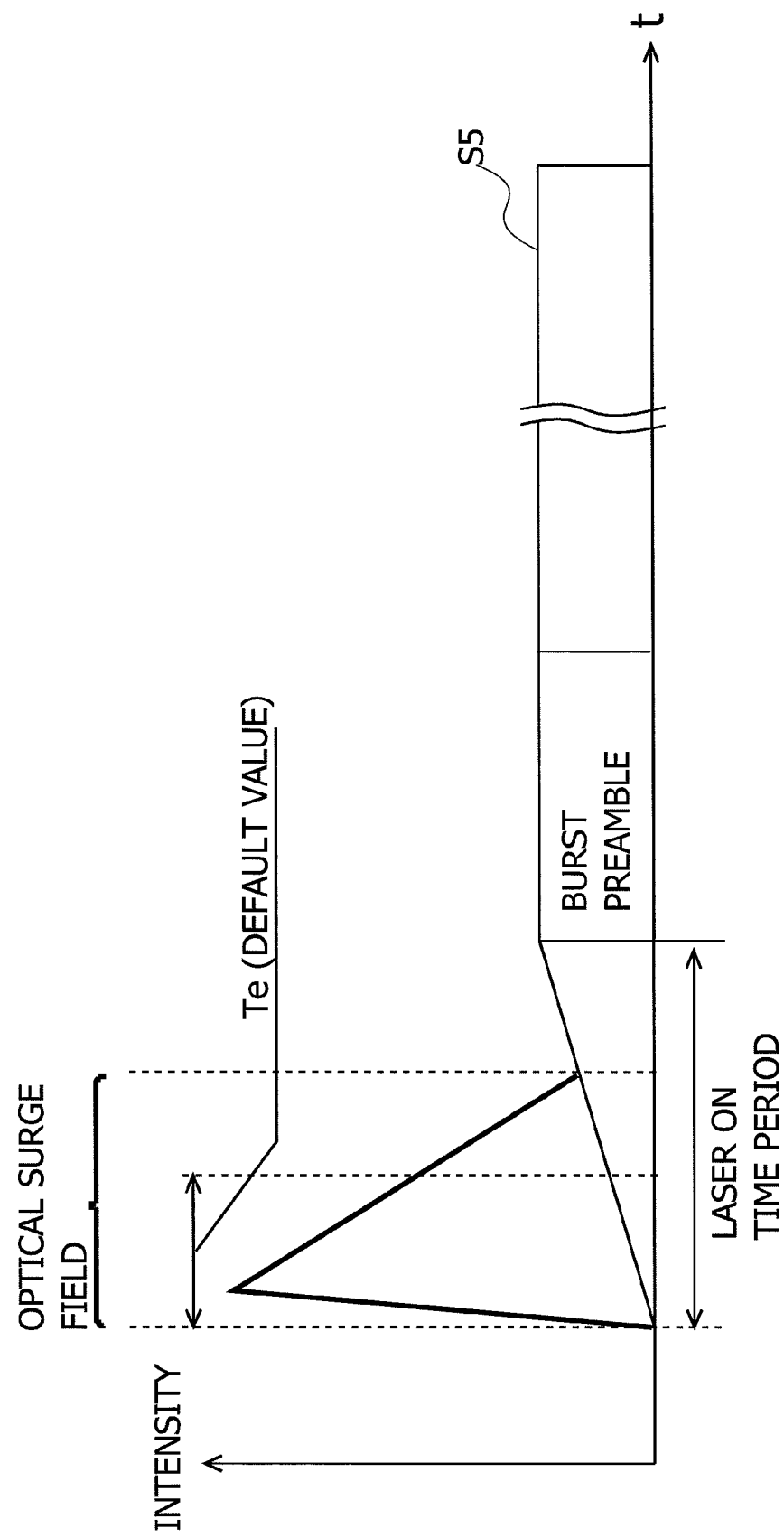
FIG. 10 is an explanatory diagram when elimination time is changed.

The optical level control apparatus 10 can be therefore used in the path along which an optical burst signal S5 taking a shape as depicted in FIG. 10 transmitted.

To be specific, when this optical burst signal S5 is inputted to the input port 11, with a length of the optical surge field being longer than "Te", it follows that the optical burst signal exhibiting a relatively large signal intensity of the head field is output from the output port 15 of the optical level control apparatus 10. Then, when this optical burst signal is transmitted to the OLT 40, an error normally called "input power-over" occurs. Hence, an administrator of the optical communication system recognizes based on error information output by the OLT 40 that the optical surge field is not sufficiently eliminated in the present elimination time Te. Accordingly, the administrator can prevent the occurrence of the input power-over by changing the elimination time Te to a much larger value in a way that connects a computer to the setting port 18.

Figure 11:
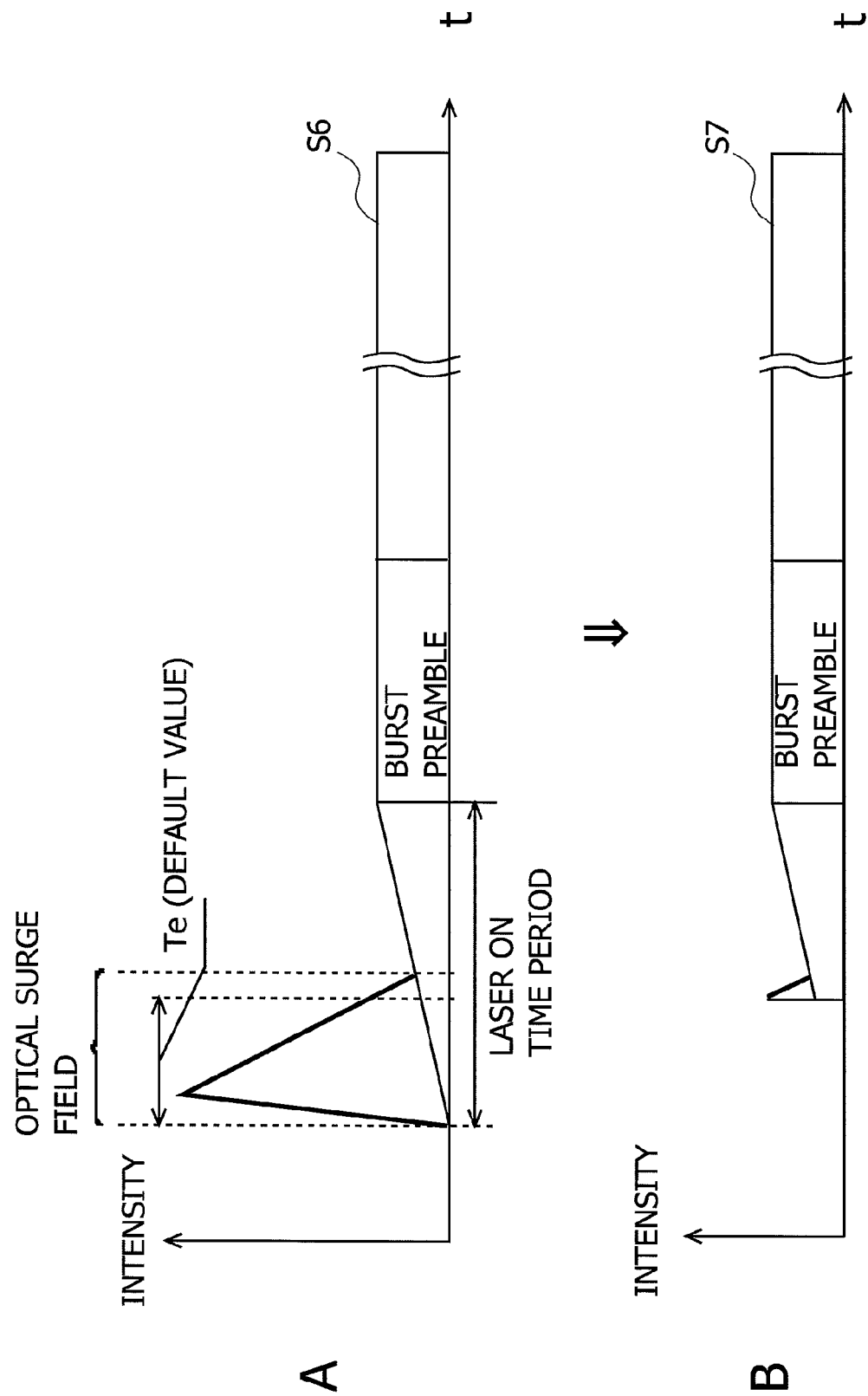
FIG. 11 is an explanatory diagram of the functions of the optical level control apparatus according to the first embodiment.

Note that even if the optical surge field is not completely eliminated, the input power-over does not occur as the case may be. Specifically, for instance, when an optical burst signal S6 taking a shape as depicted in FIG. 11A is inputted to the input port 11, an optical burst signal S7 as depicted in FIG. 11B is output from the output port 15. This optical burst signal S7 is a signal with no occurrence of the input power-over though the optical surge field is not completely eliminated.

Accordingly, it is not determined from the occurrence or non-occurrence of the input power-over whether the optical surge field is completely eliminated or not, however, if the input power-over does not occur, the ONU 30 normally can transmit the information to the OLT 40 without any problem. Then, even when the optical level control apparatus 10 is used in the state of outputting the optical signal such as the optical burst signal S7, as apparent from a comparison between the signal S6 and the signal S7, the intensity of the head field of the optical burst signal inputted to the OLT 40 is reduced. Hence, the use of the optical level control apparatus 10 can prevent the optical surge due to the FA 35 from adversely affecting the reception apparatus (OLT 40 etc.) for the optical burst signal at all times (without depending on whether used in the state enabled to completely eliminate the optical surge field).

Second Embodiment

A configuration and operations of the optical level control apparatus according to a second embodiment will hereinafter be described by focusing those different from the optical level control apparatus 10 according to the first embodiment.

Figure 12:
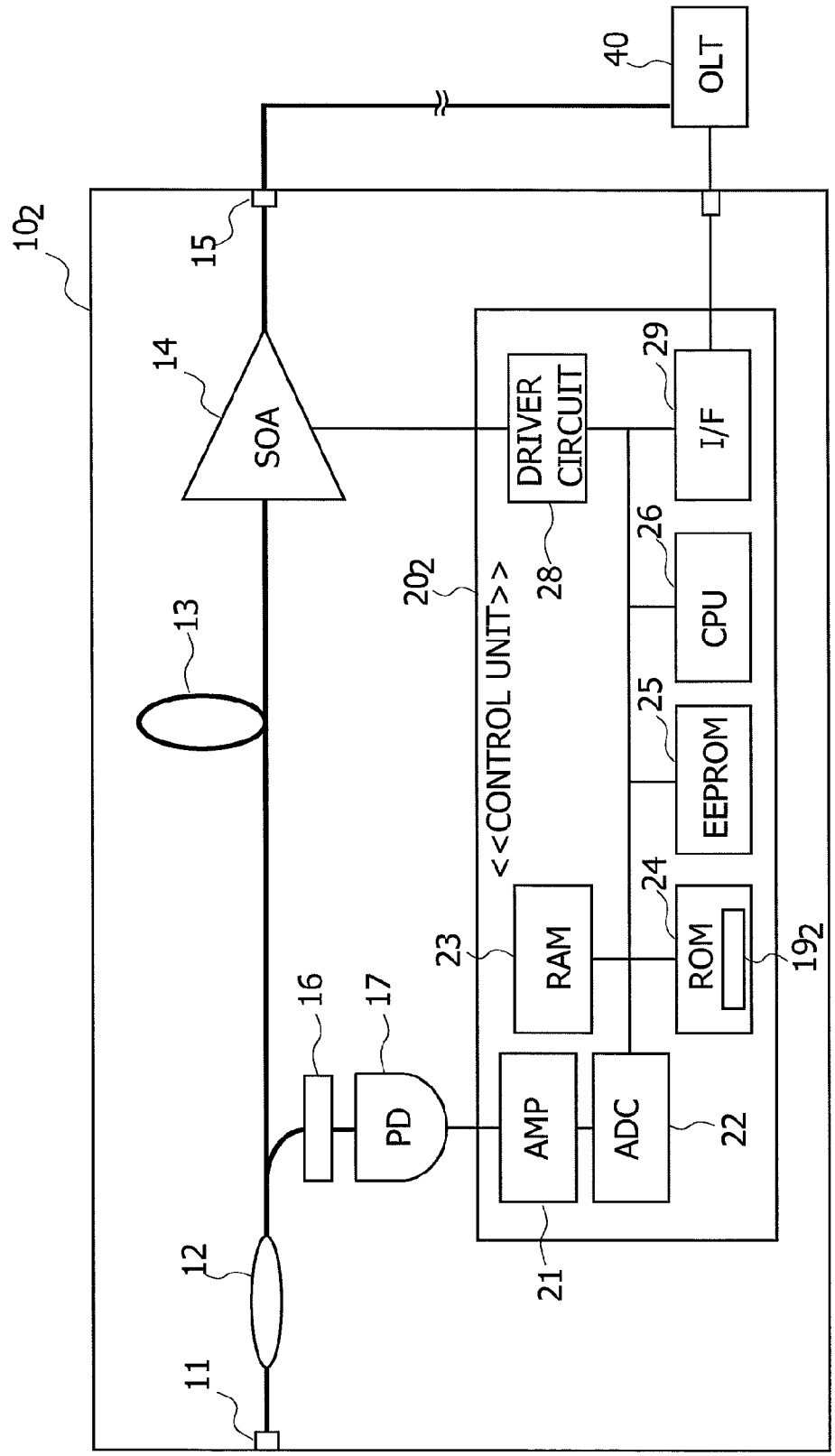
FIG. 12 is an explanatory diagram of a hardware configuration of the optical level control apparatus according to a second embodiment and a connection topology with the OLT.
Figure 13A:
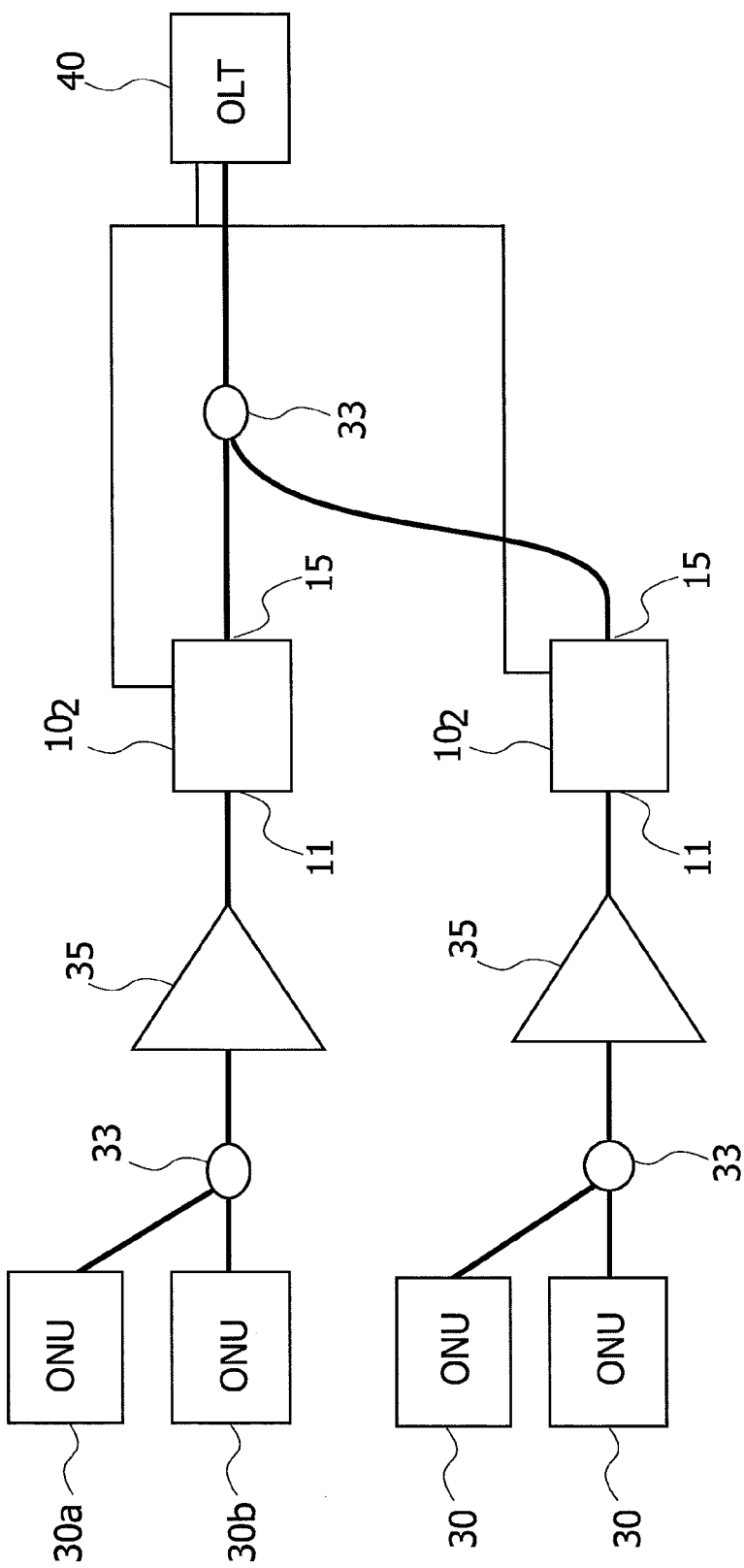
FIG. 13A is an explanatory diagram of an example of a configuration of the optical communication system that can be built up by use of the optical level control apparatus according to the second embodiment.
Figure 13B:
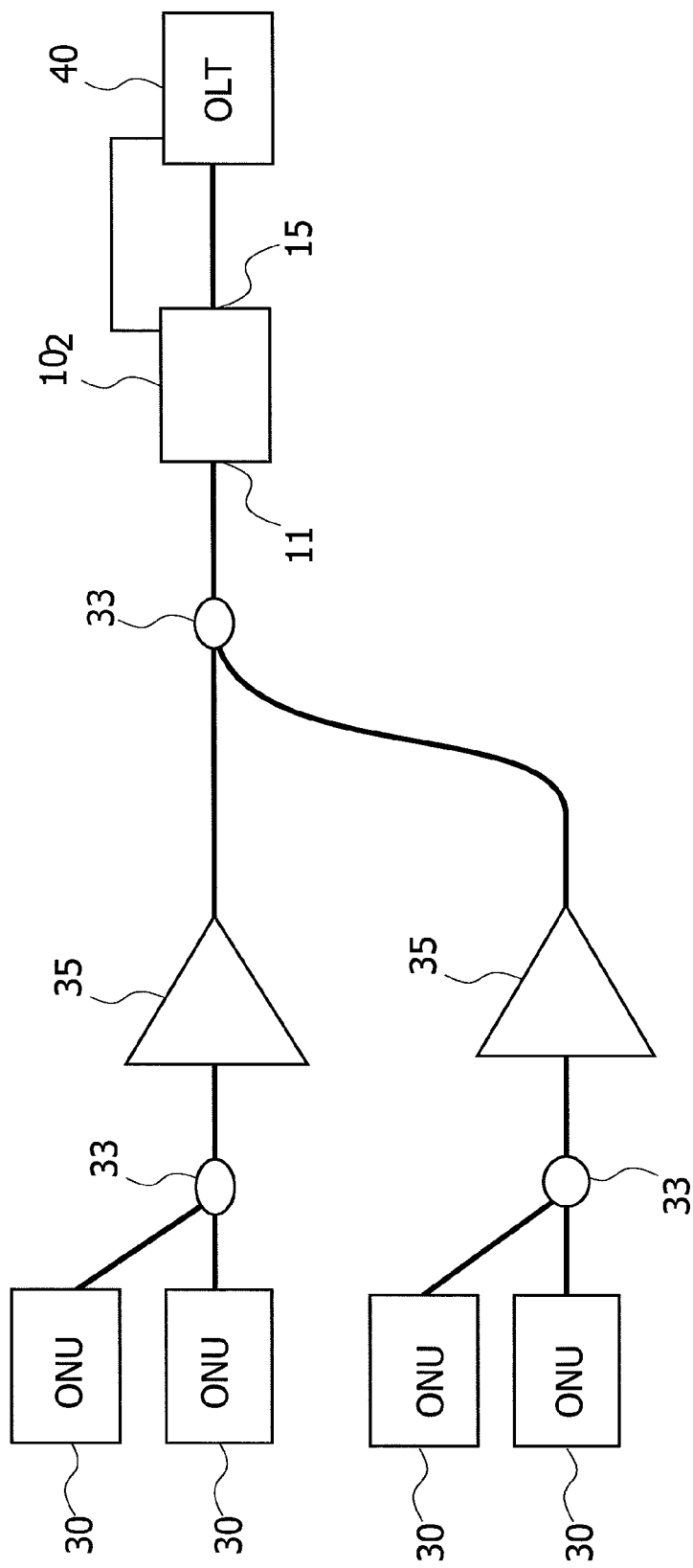
FIG. 13B is an explanatory diagram of an example of the configuration of the optical communication system that can be built up by use of the optical level control apparatus according to the second embodiment.

FIG. 12 illustrates a hardware configuration of an optical level control apparatus $10_2$ according to the second embodiment and a connection topology with the OLT 40. Further, FIGS. 13A and 13B depict examples of a configuration of the optical communication system built up by use of the optical level control apparatus $10_2$ according to the second embodiment. Note that in each example of the configuration of the optical communication system illustrated in FIGS. 13A and 13B, the illustrations of the components (FA 35' and WDM coupler 38) for the downlink signal are omitted similarly to the examples of the configuration of the optical communication system illustrated in FIGS. 2A-2C.

The optical level control apparatus $10_2$ according to the second embodiment is an apparatus developed on the assumption of being used as the component of the optical communication system in which the laser ON time period of the optical burst signal transmitted by each ONU 30 is different as the case may be. Note that the optical level control apparatus $10_2$ is also the apparatus developed on the assumption of being used in the form as illustrated in FIGS. 13A and 13B (not used in the form as depicted in FIG. 2A).

The OLT 40 combined with the optical level control apparatus $10_2$ is basically an OLT for the system (e.g., 10G-EPON (10 Gbit/s Ethernet-based PON)) permitting that the laser ON time period of the optical burst signal transmitted by each ONU 30 is different. On the occasion of configuring the optical communication system by using the optical level control apparatus $10_2$, however, an apparatus configured to provide such an OLT with an information notifying function to notify each optical level control apparatus $10_2$ of the following information via the I/F 29, is used as the OLT 40.

Identifying information (MAC address and ONU_ID (Logical Link Identifier), which will hereinafter be notated such as ONU_ID) of the ONU 30 found out in a discovery sequence;

Transmission timing information (information corresponding to the information notified to each ONU 30 from the OLT 40 in a GATE frame) containing ONU_ID and information for specifying transmission timing (transmission starting time) and a transmission quantity of the optical burst signal;

Event that the input power-over occurs; and

Event that a reception signal error occurs.

Herein, the "input power-over" connotes an error deemed to occur when the intensity of the inputted optical burst signal is higher than a fixed intensity. Moreover, the "reception signal error" connotes an error deemed to occur when the inputted optical burst signal is not normally converted into the digital signal (such as being disabled from taking signal synchronization and detecting the error by a parity check).

Note that the information notifying function possessed by the OLT 40 may be a function to transmit, to each optical level control apparatus $10_2$, only the information on the ONU 30 located at the upper stage of each optical level control apparatus $10_2$. However, the following discussion will deal with the operations of the optical level control apparatus $10_2$ on the assumption that the information notifying function is the function to transmit the same information to all the optical level control apparatuses $10_2$.

As obvious from a comparison between FIG. 12 and FIG. 1, the optical level control apparatus $10_2$ according to the second embodiment is an apparatus configured to replace the control unit 20 of the optical level control apparatus 10 according to the first embodiment by a control unit $20_2$.

The control unit $20_2$ is an ASIC configured to replace the I/F 27 of the control unit 20 by an interface circuit (I/F) 29 for the communications with the OLT 40 and to store a program $19_2$ having a different content from the program 19 on the flash ROM 24.

A process executed by the CPU 26 in accordance with the program $19_2$ is, similarly to the process executed by the CPU 26 within the control unit 20, basically a process of controlling the SOA 14 so as to eliminate the field corresponding to the elimination time Te from the head of the optical burst signal inputted to the input port 11.

The CPU 26 of the control unit $20_2$, however, operates in a state of retaining an elimination time management table as illustrated in FIG. 14, i.e., the elimination time management table stored with the elimination time Te and an adjusted Flag ("Flag") in the way of being associated with ONU_ID.

Concretely, the CPU 26 starting the operation according to the program $19_2$, at first, prepares a null elimination time management table on the EEPROM 25. Then, the CPU 26, when notified of ONU_ID of the ONU 30 from the OLT 40 finding out a new ONU 30, adds a record to the elimination time management table, the record containing an initial value set in ONU_ID, an initial value set in the elimination time Te and an initial value set in the adjusted Flag. Note that the record added by the CPU 26 to the elimination time management table on this occasion is a record in which a value (e.g., 500 ns) approximate to a maximum value (512 ns) of the laser ON time period is set as the initial value of the elimination time Te, and "0" is set as the initial value of the adjusted Flag.

Further, the CPU 26, when notified of the transmission timing information from OLT 40, stores the transmission timing information on the RAM 23.

Figure 15:
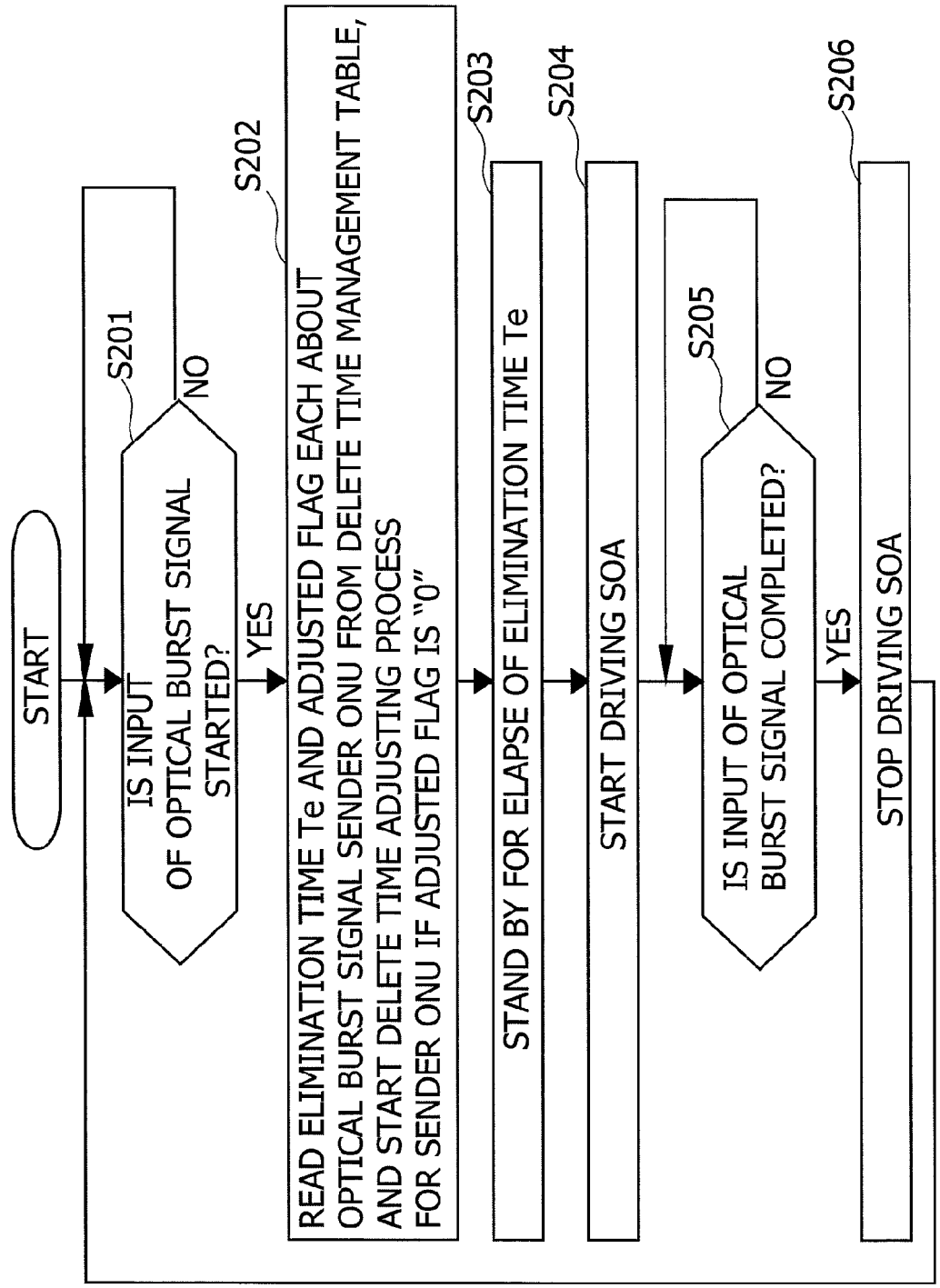
FIG. 15 is a flowchart of a second optical level control process executed by the CPU in the optical level control apparatus according to the second embodiment.

Furthermore, the CPU 26 executes a second optical level control process in a procedure illustrated in FIG. 15 in parallel with the process described above.

Namely, the CPU 26 executing this second optical level control process normally monitors in step S201 whether the optical burst signal starts being inputted to the input port 11. Note that the process in step S201 is the same as the process in S101 in the optical level control process (FIG. 6).

When detecting that the optical burst signal starts being inputted to the optical level control apparatus 10$_2$ (step S201; YES), the CPU 26 executes the following process in step S202.

The CPU 26 compares reception timing of the optical burst signal starts being received with each piece of the transmission timing information on the RAM 23, thereby specifying ONU_ID of the ONU 30 that transmits the optical burst signal. Subsequently, the CPU 26 reads the elimination time Te and the adjusted Flag each associated with the specified ONU_ID from the elimination time management table. Then, the CPU 26, if the value of the adjusted Flag read from the elimination time management table is "0", starts an elimination time adjusting process (which will be described in detail later on) for the ONU 30 identified by the specified ONU_ID, and thereafter finishes the process in step S202.

Moreover, the CPU 26, whereas if the value of the adjusted Flag is not "0", finishes the process in step S202 without starting the elimination time adjusting process.

The CPU 26 finishing the process in step S202 stands by for an elapse of the elimination time Te read from the elimination time management table (step S203). Then, the CPU 26 executes, in subsequent step S204, the same process as the process in step S103.

Note that if unable to specify, though not notated in the flowchart, ONU_ID during the process in step S202, the CPU 26 executes not the processes in step S203 and step S204 but a process of increasing the drive current of the SOA 14 up to about 65 mA throughout the fixed time. Namely, the CPU 26 executes not the process for deleting the head field of the optical burst signal but the process for decreasing the intensity of the head field of the optical burst signal.

When finishing the process in step S204 (or the process executed as a substitute for the processes in steps S203 and S204), the CPU 26 executes, in steps S205 and S20, the same processes as those in steps S104 and S105. Then, the CPU 26 finishing the process in step S206 loops back to step S201 and monitors therein whether the next optical burst signal starts being inputted.

The elimination time adjusting process initiated when executing the process in step S202 is a process of adjusting the elimination time related to ONU_ID (which will hereinafter be termed focused ONU_ID) specified when executing the process in step S202.

Figure 16:
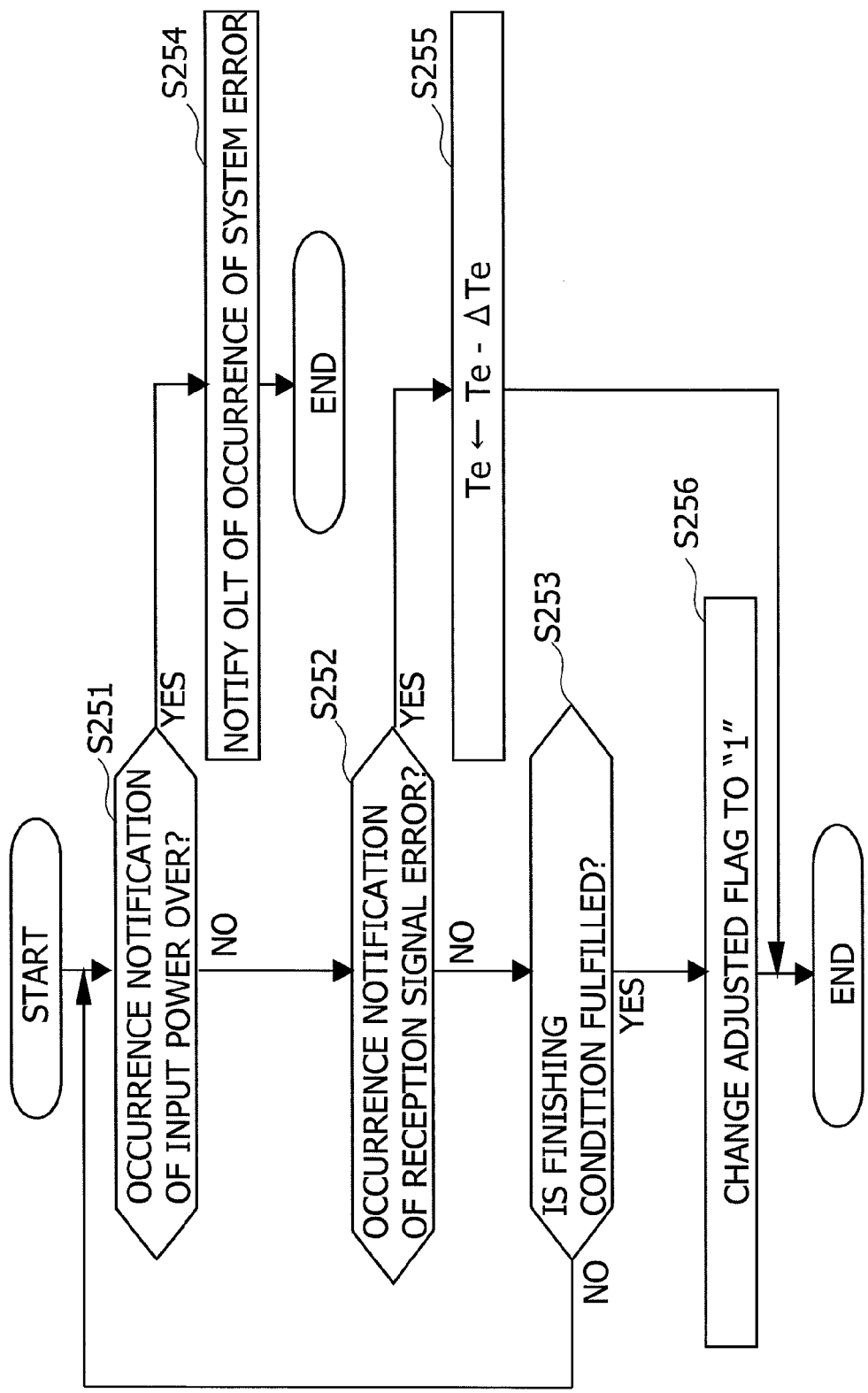
FIG. 16 is a flowchart of an elimination time adjusting process executed by the CPU in the optical level control apparatus according to the second embodiment.

FIG. 16 illustrates a flowchart of the elimination time adjusting process.

As illustrated in FIG. 16, the elimination time adjusting process is basically the process of monitoring whether there is made notification of occurrence of the input power-over or the reception signal error (step S251/S252; YES) till a finishing condition is satisfied (step S253; YES). Herein, a meaning of "the finishing condition is satisfied" is that "it is determined that the optical burst signal with its input triggering the start of the elimination time adjusting process is received by the OLT 40 without any occurrence of the error, the determination being made from an event that the occurrence notification of the input power-over or the reception signal error does not reach the I/F 29 for a predetermined period of waiting time". Note that the elimination time adjusting process according to the second embodiment is the process, which expends the waiting time as long as the "predetermined period of waiting time" till completing the process in step S105.

Then, the CPU 26 executing the elimination time adjusting process, when notified of the occurrence of the input power-over (step S251; YES), notifies the OLT 40 of the occurrence of a system error (step S254) and thereafter finishes the elimination time adjusting process.

Further, the CPU 26, when notified of the occurrence of the reception signal error (step S252; YES), subtracts a fixed value ΔTe (e.g., 50 ns) from the elimination time Te associated with the focused ONU_ID on the elimination time management table (step S255). Then, the CPU 26 finishing the process in step S255 terminates the elimination time adjusting process.

Moreover, the CPU 26, if the finishing condition is satisfied without being notified of the occurrence of any error (step S253; YES), changes, to "1", a value of the adjusted Flag associated with the focused ONU_ID on the elimination time management table (step S256). Subsequently, the CPU 26 finishes the elimination time adjusting process.

The functions of the optical level control apparatuses 10$_2$ will hereinafter be described more specifically by taking the optical level control apparatus 10$_2$ illustrated in at the upper stage of FIG. 13A for instance. It is to be noted that the optical level control apparatuses 10$_2$ depicted at the upper stage and the lower stage of FIG. 13A are referred to as the upper-stage optical level control apparatus 10$_2$ and the lower-stage optical level control apparatus 10$_2$ respectively in the following discussion. Further, the elimination time Te about an ONU 30$a$ and the elimination time Te about an ONU 30$b$ on the elimination time management table (FIG. 14) are notated such as Te[a], Te[b] respectively. Moreover, each of initial values of Te[a] and Te[b] is to be 500 ns, and the laser ON time period of the ONU 30$a$ and the laser ON time period of the ONU 30$b$ are to be 512 ns and 200 ns, respectively.

In this case, the optical burst signal overlapped with the optical surge due the FA 35 and having the laser ON time period of 512 ns or 200 ns, is inputted to the input port 11 of the upper-stage optical level control apparatus 10$_2$. However, a quantity of the optical surge superposed on the optical burst signal differs depending on specifications and a state of the FA 35.

Figure 17:
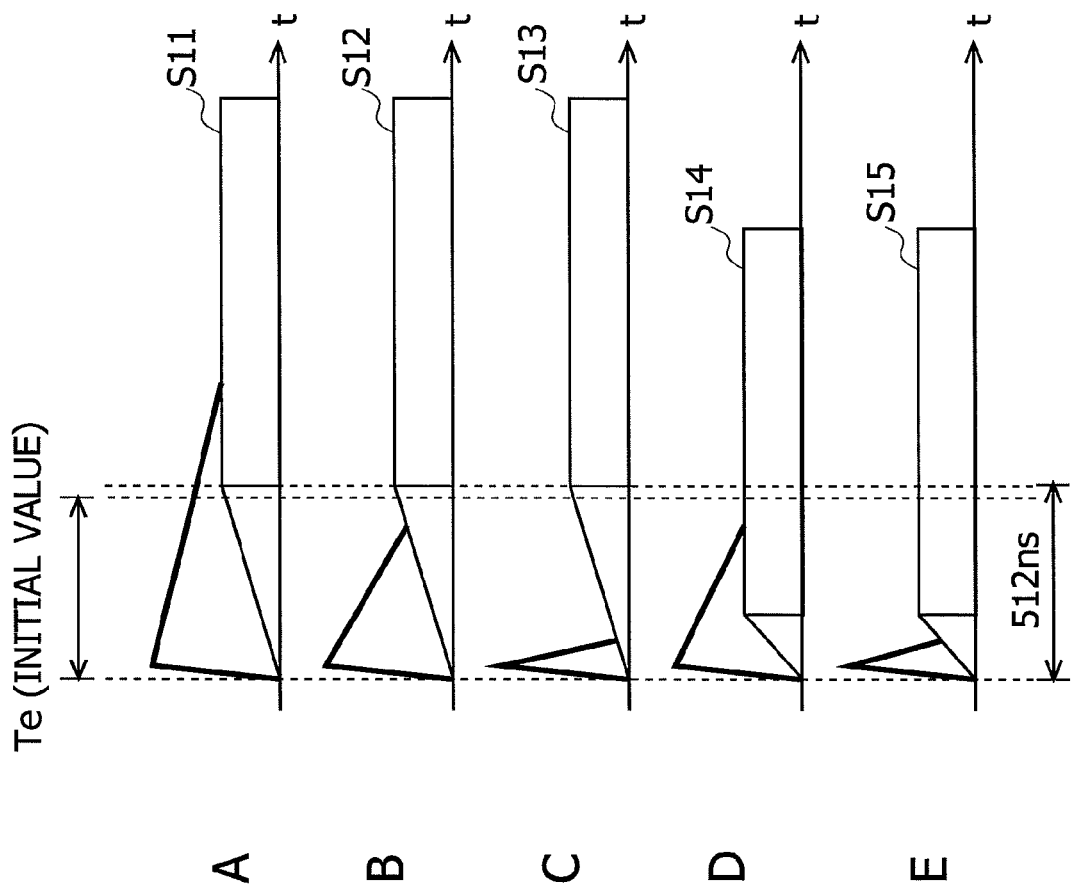
FIG. 17 is an explanatory diagram of the functions of the optical level control apparatus according to the second embodiment.

Therefore, the optical burst signals coming from the ONU 30$a$ are inputted to the upper-stage optical level control apparatus 10$_2$ as optical burst signals S11-S13 taking shapes as illustrated in FIGS. 17A-17C. Further, the optical burst signals coming from the ONU 30$b$ are inputted to the upper-stage optical level control apparatus 10$_2$ as optical burst signals S14, S15 taking shapes as illustrated in FIGS. 17D and 17E. Note that an event of inputting the signals such as the optical burst signals S11, S14 with their optical surges superposed on up to the main field (modulated field) to the upper-stage optical level control apparatus $10_2$, is normally applied to a case where the FA 35 existing at the front stage of the upper-stage optical level control apparatus $10_2$ gets into a fault.

Figure 18:
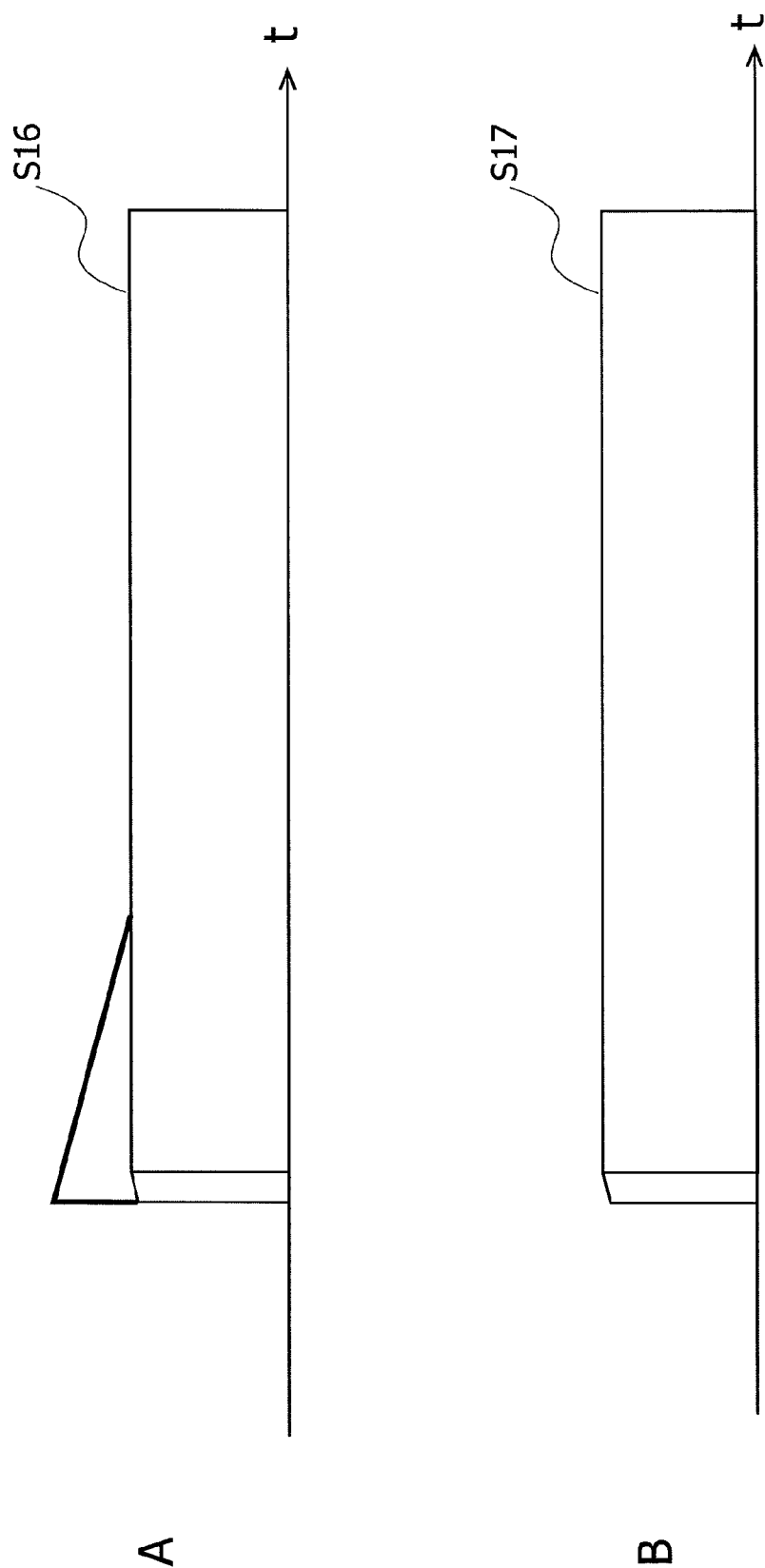
FIG. 18 is an explanatory diagram of the functions of the optical level control apparatus according to the second embodiment.

Then, the upper-stage optical level control apparatus $10_2$, when the optical burst signal is inputted from the ONU 30a, outputs the signal in a way that deletes a field corresponding to the Te[a] time from the head, however, the initial value of the Te[a] is 500 ns. Accordingly, if the optical burst signal S11 is inputted to the upper-stage optical level control apparatus $10_2$ in a state where the initial value of the Te[a] remains unchanged, it follows that the optical burst signal S16 taking a shape depicted in FIG. 18A is transmitted to the OLT 40. Moreover, if the optical burst signal S12 or S13 is inputted to the upper-stage optical level control apparatus $10_2$ in a state where the initial value of the Te[a] remains unchanged, it follows that the optical burst signal S17 taking a shape depicted in FIG. 18B is transmitted to the OLT 40.

The optical burst signal S16 is the signal in which the input power-over occurs. Namely, when receiving this optical burst signal S16, the OLT 40 notifies the upper-stage optical level control apparatus $10_2$ via the I/F 29 that the input power-over occurs. Then, the CPU 26 in the upper-stage optical level control apparatus $10_2$ executes the elimination time adjusting process (FIG. 16) for the ONU 30a, and hence it follows that the OLT 40 is notified of the system error (the fault of the FA 35 located at the front stage of the upper-stage optical level control apparatus $10_2$).

Note that if the information notifying function possessed by the OLT 40 is the function to transmit the same information to all the optical level control apparatuses $10_2$, the lower-stage optical level control apparatus $10_2$ also receives the notification that the input power-over occurs. However, the upper-stage optical level control apparatus $10_2$ and the lower-stage optical level control apparatus $10_2$ are different in terms of the reception timing of the optical burst signals, and therefore the CPU 26 in the lower-stage optical level control apparatus $10_2$ does not start the elimination time adjusting process. Accordingly, in this case, even when the lower-stage optical level control apparatus $10_2$ is notified of the occurrence of the input power-over, it follows that no special process is carried out.

Further, when the optical burst signal S12 or S13 (FIG. 17) is inputted, the optical burst signal S17 (FIG. 18) output from the upper-stage optical level control apparatus $10_2$ is a signal that can be processed by the OLT 40 without any problem. Therefore, the CPU 26 executing the elimination time adjusting process for the ONU 30a changes the value of the adjusted Flag for the ONU 30a to "1" (refer to steps S253, S256 in FIG. 16). Then, the elimination time adjusting process is a process executed when the value of the adjusted Flag is "0" (refer to step S202 in FIG. 15), and hence it follows that the adjustment related to Te[a] comes to an end in a state such as "Te[a]=initial value".

Further, if the optical burst signal coming from the ONU 30b is the optical burst signal S15 (FIG. 17E), it follows that the optical burst signal with its body field being partially eliminated is transmitted to the OLT 40. When such an optical burst signal is transmitted, the reception signal error occurs in the OLT 40, and the information notifying function notifies the upper-stage optical level control apparatus $10_2$ of the occurrence of the reception signal error.

Subsequently, the CPU 26 in the upper-stage optical level control apparatus $10_2$ notified of the occurrence of the reception signal error does not change the value of the adjusted Flag of the ONU 30b, while the elimination time Te for the ONU 30b is decremented by ΔTe (step S255 in FIG. 16). Accordingly, when the next optical burst signal S15 coming from the ONU 30b is inputted to the upper-stage optical level control apparatus $10_2$, there are executed a process of outputting the optical burst signal exhibiting a less amount of deletion than the deletion amount of the last time and the elimination time adjusting process. Then, when notified of the occurrence of the reception signal error, the elimination time adjusting process involves decrementing the elimination time Te for the ONU 30b by ΔTe without changing the value of the adjusted Flag for the ONU 30b.

Figure 19:
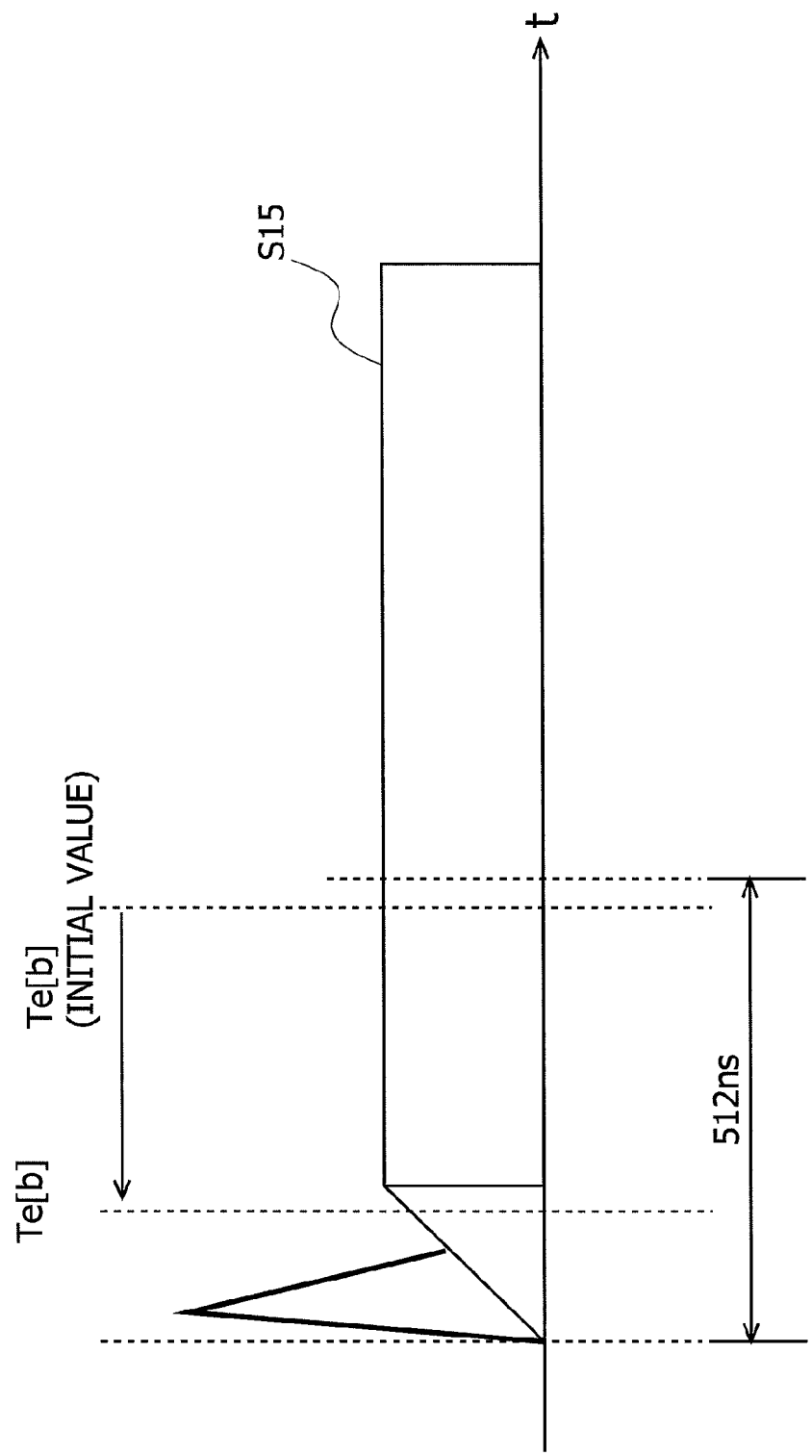
FIG. 19 is an explanatory diagram of the functions of the optical level control apparatus according to the second embodiment.

The processes described above are repeatedly executed for each optical burst signal S15 coming from the ONU 30b till the notification of the occurrence of the reception signal error ceases. Accordingly, as schematically illustrated in FIG. 19, when Te[b] becomes a value equal to or smaller than the laser ON time period of t the ONU 30b, it follows that the adjustment about Te[b] is finished.

The same is applied to the operation of the upper-stage optical level control apparatus $10_2$ in such a case that the optical burst signal coming from the ONU 30b is the optical burst signal S14 (FIG. 17D). In this case, however, when Te[a] is subtracted down to a certain value, the input power-over occurs. Hence, it follows that the OLT 40 is notified of the system error.

As described so far, the optical level control apparatus $10_2$ has the function to convert the variety of optical burst signals having the different lengths of laser ON time period into the optical burst signals, with the fields overlapped with the optical surges being eliminated, which can be received by the OLT 40 without any problem. Therefore, the use of the optical level control apparatus $10_2$ enables realization of the optical communication system having the configuration of adding the optical fiber amplifier to the 10G-EPON in such a form that the OLT 40 is hard to get failed and deteriorated due to the optical burst signal overlapped with the optical surge.

Furthermore, the optical level control apparatus $10_2$ is the apparatus configured to convert the inputted optical burst signal into a signal eliminating a possibility that the reception signal error occurs in the OLT 40 and having a short period of continuation time (a value given by "Te initial value−n·ΔTe" (where "n" is an integer) is the largest value) (see FIGS. 18 and 19) and to output the thus-converted signal. Namely, the optical burst signal output from the optical level control apparatus $10_2$ is such a type of signal that the optical surge is superposed on up to the body field when amplified by the FA 35 as the case may be. Therefore, the optical level control apparatus $10_2$ can, though not used in the forma illustrated in FIG. 2A and if the optical burst signal is converted into a much shorter signal, narrow down an interval between the optical burst signals after being multiplexed by the optical coupler.

Accordingly, if the optical communication system (see FIG. 13A) is configured by the plurality of optical level control apparatuses $10_2$ to multiplex the outputs thereof by the optical couplers, a bandwidth can be utilized more efficiently by narrowing down the interval between the post-multiplexing optical burst signals.

Third Embodiment

Figure 20:
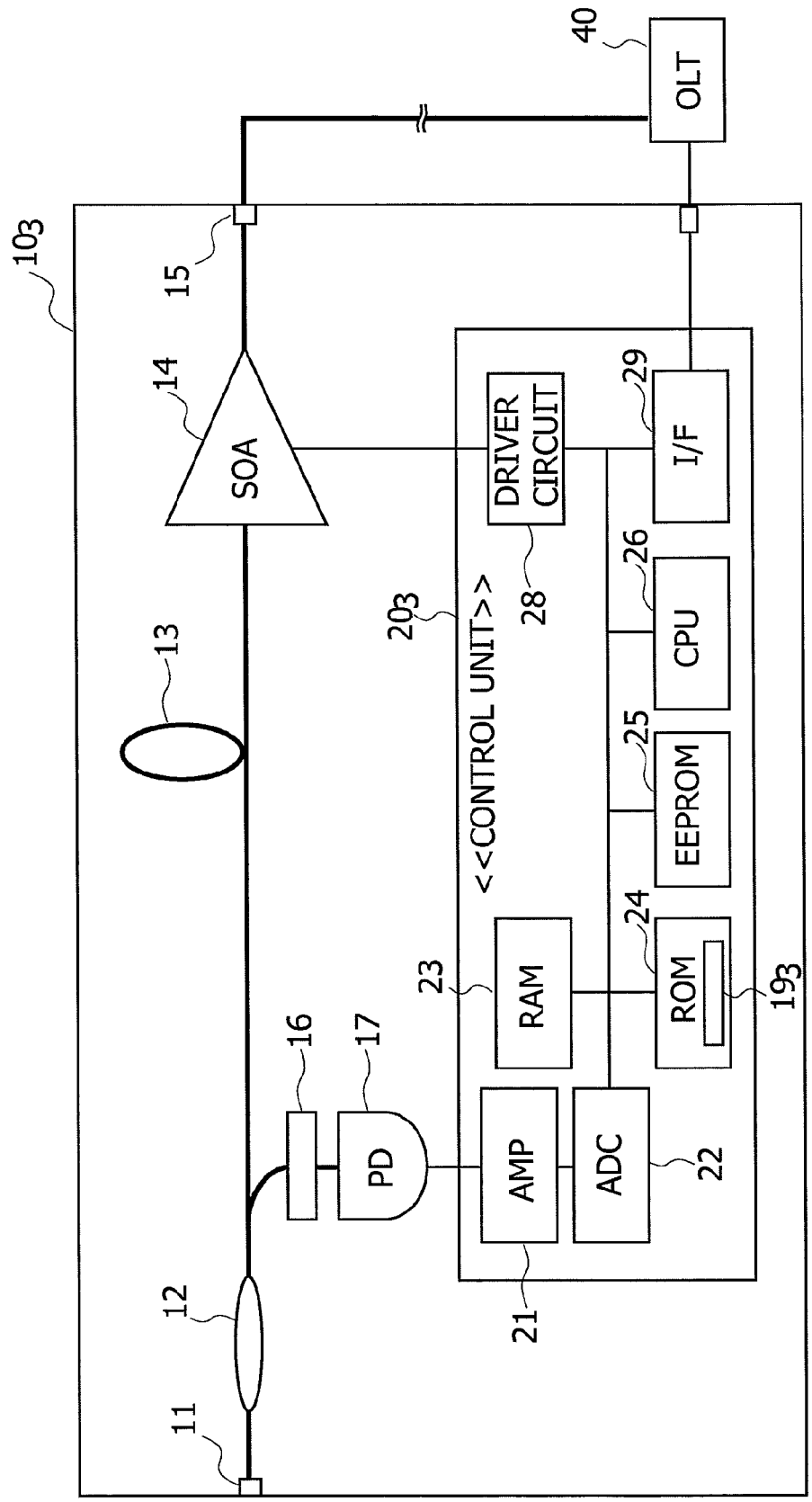
FIG. 20 is an explanatory diagram of a hardware configuration of the optical level control apparatus according to a third embodiment and a connection topology with the OLT.

FIG. 20 illustrates a hardware configuration of an optical level control apparatus $10_3$ according to a third embodiment and a connection topology with the OLT 40.

As apparent from a comparison between FIG. 20 and FIG. 12, the optical level control apparatus $10_3$ is an apparatus having the same hardware configuration as the optical level control apparatus $10_2$ has. However, a program $19_3$ different from the program $19_2$ is stored on the ROM 24 within a control unit $20_3$ of the optical level control apparatus $10_3$.

The basic operation of the CPU 26 according to the program $19_3$ is the same as the operation of the CPU 26 according to the program $19_2$.

Namely, the CPU 26 in the control unit $20_3$ operates in the state of retaining the elimination time management table (FIG. 14) stored with the elimination time Te and the adjusted Flag in the way of being associated with ONU_ID on the EEPROM 25. Further, the CPU 26 in the control unit $20_3$, when notified of the transmission timing information from the OLT 40, stores the transmission timing information on the RAM 23.

Figure 21:
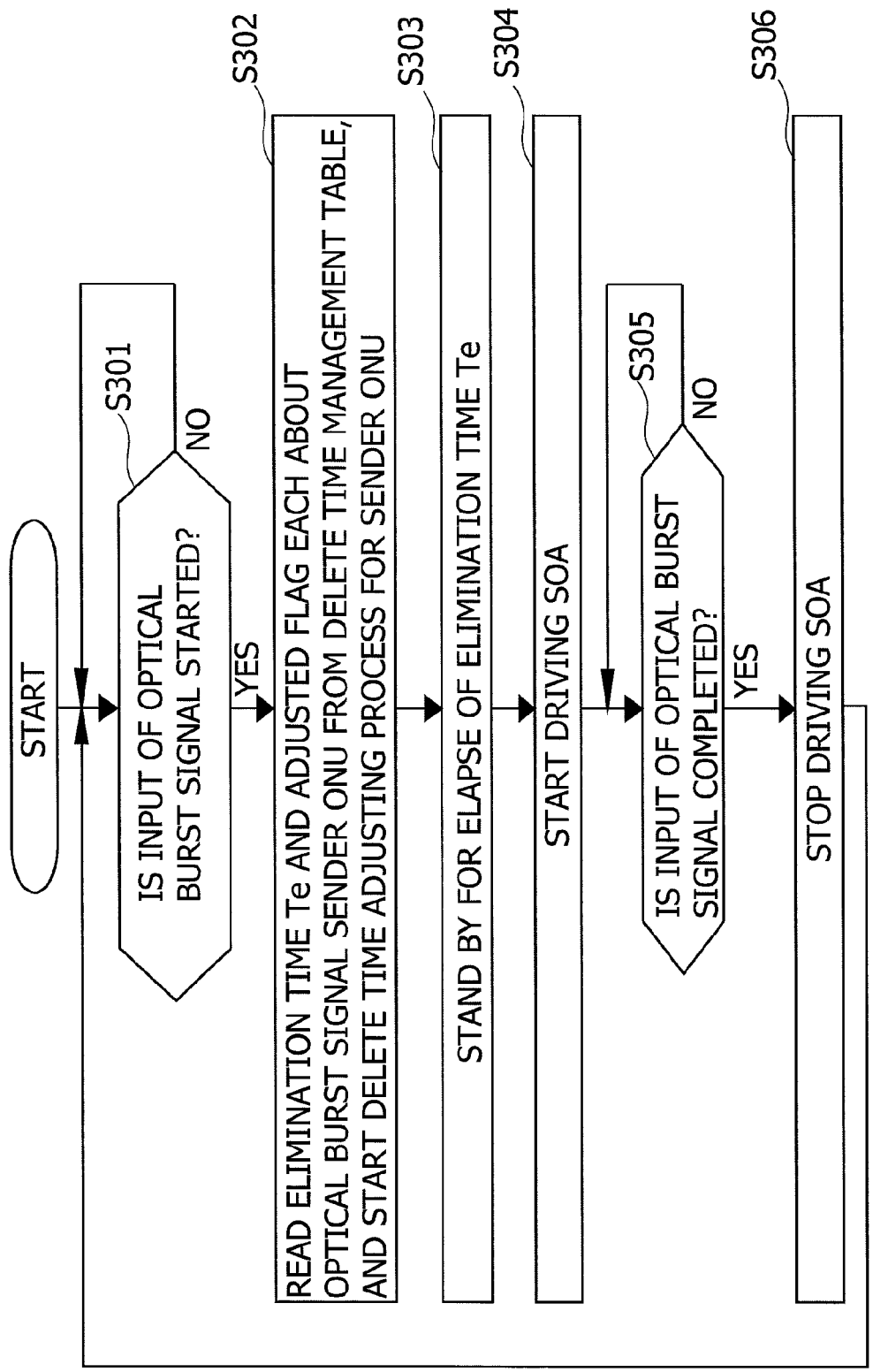
FIG. 21 is a flowchart of a third optical level control process executed by the CPU in the optical level control apparatus according to the third embodiment.

Moreover, the CPU 26 in the control unit $20_3$ executes a third optical level control process in a procedure depicted in FIG. 21 in parallel with the process described above.

Respective processes in steps S301 and S303-S306 of the third optical level control process are the same as the processes in steps S201 and S203-S206 of the second optical level control process (FIG. 15). The process in step S302 of the third optical level control process is a process contrived to modify the process in step S202 of the second optical level control process so as to start the elimination time adjusting process for the ONU 30 identified by the specified ONU_ID without depending on the value of the adjusted Flag. Note that this third optical level control process entails, similarly to the second optical level control process, performing the process of increasing the drive current of the SOA 14 up to about 65 mA throughout the fixed time in place of the processes in steps S303 and S304 if unable to specify ONU_ID.

Figure 22:
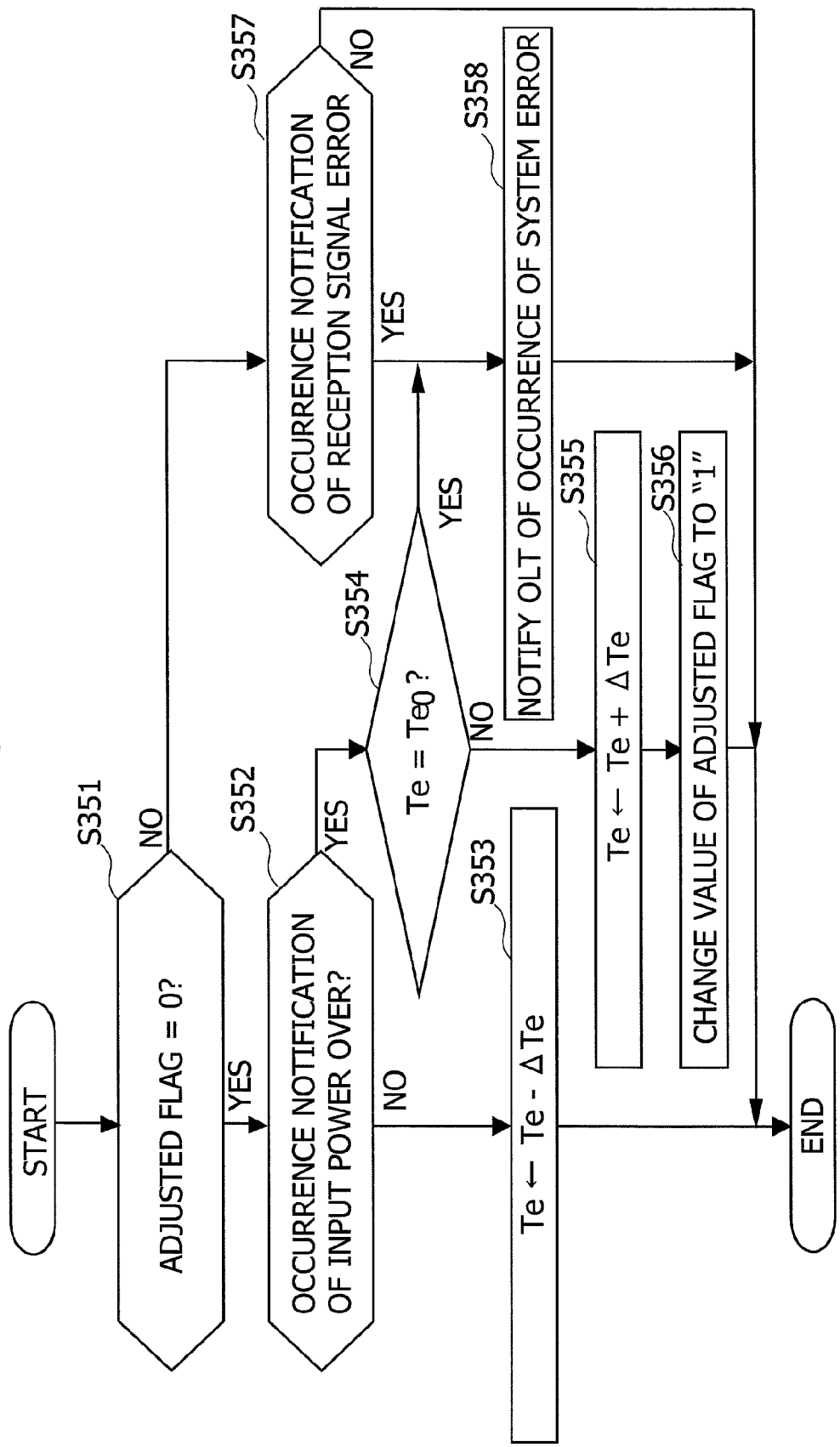
FIG. 22 is a flowchart of the elimination time adjusting process executed by the CPU in the optical level control apparatus according to the third embodiment.

Then, the elimination time adjusting process executed by the CPU 26 in the control unit $20_3$ is a process in a procedure illustrated in FIG. 22.

Namely, the CPU 26 starting the elimination time adjusting process for a certain ONU 30 (which will hereinafter be termed a focused ONU 30), at first, determines whether or not the value of the adjusted Flag read from the elimination time management table in the process of step S302 is "0" (step S351). Namely, the CPU 26 determines whether or not an adjustment of the elimination time Te related to the focused ONU 30 is not yet completed (the adjusted Flag=0).

If the adjustment of the elimination time Te related to the focused ONU 30 is not yet completed (step S351; YES), the CPU 26 stands by (monitors) for a period of first predetermined time about whether the notification of the occurrence of the input power-over is given from the OLT 40 (step S352). Herein, the "first predetermined time" connotes the time that is predetermined as the longest time till receiving the notification of the occurrence of the input power-over.

If the first predetermined time elapses without receiving the notification of the occurrence of the input power-over (step S352; NO), the CPU 26 executes the process of subtracting ΔTe from the elimination time Te related to the focused ONU 30 on the elimination time management table (step S353). Then, the CPU 26 finishes this elimination time adjusting process.

When receiving the notification of the occurrence of the input power-over before the elapse of the first predetermined time (step S352; YES), the CPU 26 determines whether or not the elimination time Te about the focused ONU 30 remains to be the initial value ("$Te_0$" in FIG. 22) (step S354). Then, the CPU 26, if the elimination time Te remains to be the initial value (step S354; YES), notifies the OLT 40 of the occurrence of the system error in step S358, and thereafter finishes this elimination time adjusting process.

Whereas if the elimination time Te does not remain to be the initial value (step S354; NO), the CPU 26 adds ΔTe to the elimination time Te about the focused ONU 30 on the elimination time management table (step S355). Then, the CPU 26 changes the value of the adjusted Flag about the focused ONU 30 on the elimination time management table to "1" (step S356), and thereafter finishes the elimination time adjusting process.

Moreover, if the value of the adjusted Flag about the focused ONU 30 is "1" (step S351; NO), the CPU 26 stands by (monitors) for a period of second predetermined time about whether the notification of the occurrence of the reception signal error is given from the OLT 40 (step S357). Note that the "second predetermined time" connotes the time that is predetermined as the longest time till receiving the notification of the occurrence of the reception signal error.

Then, when receiving the notification of the occurrence of the reception signal error before the second predetermined elapses (step S357; YES), the CPU 26 notifies the OLT 40 that the system error occurs in step S358, and thereafter finishes the elimination time adjusting process. Furthermore, if the second predetermined elapses without receiving the notification of the occurrence of the reception signal error (step S357; NO), the CPU 26 finishes the elimination time adjusting process without executing no particular process.

The content of t the elimination time adjusting process executed by the CPU 26 in the optical level control apparatus $10_3$ will hereinafter be described more specifically with reference to FIG. 23. Incidentally, the following discussion assumes that no other optical level control apparatus $10_3$ exist before and after the optical level control apparatus $10_3$.

Figure 23:
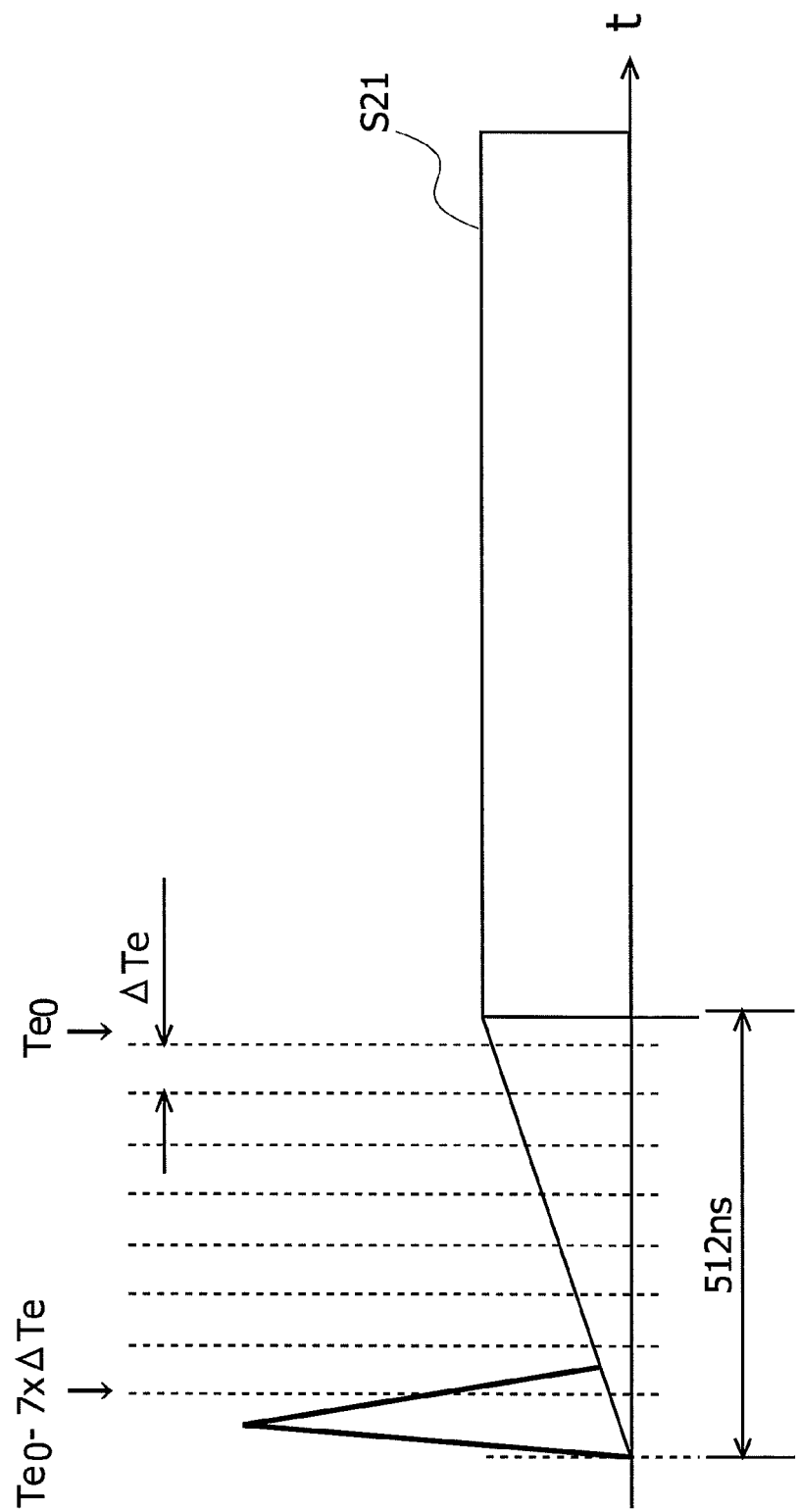
FIG. 23 is an explanatory diagram of a content of the elimination time adjusting process.

Such a case is considered that an optical burst signal S21 taking a shape illustrated in FIG. 23 is inputted to the optical level control apparatus $10_3$ under a situation in which the value of the elimination time Te and the value of the adjusted Flag about a sender ONU 30 (which will hereinafter be termed a focused ONU 30) become "$Te_0$" and "0", respectively. In this case, the optical burst signal (such as the optical burst signal S17 depicted in FIG. 18B) with the input power-over not occurring in the OLT 40 is output from the optical level control apparatus $10_3$.

Accordingly, the CPU 26 executing the elimination time adjusting process (FIG. 22) carried out a process in step S353, thereby decrementing the elimination time Te about the focused ONU 30 on the elimination time management table by ΔTe.

Then, the optical burst signal coming from the focused ONU 30 is inputted as the optical burst signal S21 taking the shape depicted in FIG. 23 to the optical level control apparatus $10_3$, in which case the input power-over does not occur even when decrementing the elimination time Te about the focused ONU 30 by ΔTe. It therefore follows that the elimination time Te about the focused ONU 30 is decremented further by ΔTe. Then, when the elimination time Te takes a certain value (given by $Te_0-7\times\Delta Te$ in the case illustrated in FIG. 23) by repeating the process described above some number of times, the optical burst signal causing the occurrence of the input power-over is output from the optical level control apparatus $10_3$.

Accordingly, the CPU 26 executing the elimination time adjusting process is notified of the occurrence of the input power-over. Then, a relationship such as $Te=Te_0$ is not established (step S354; NO), and hence the Te value about the focused ONU 30 is returned to the Te value (given by $Te_0-6\times\Delta Te$ in the case illustrated in FIG. 23) of the last time, which does not cause the occurrence of the input power-over (step S355). Moreover, for storing an event that the adjustment is temporarily completed (the details thereof will be described later on), the value of the adjusted Flag about the focused ONU 30 is changed to "1" (step S356).

Note that the determination as to whether or not the relationship of $Te=Te_0$ is established when notifying of the occurrence of the input power-over intends determining whether or not the optical burst signal inputted to the optical level control apparatus 10₃ is the optical burst signal taking a shape depicted in FIG. 17A. Namely, also when the optical burst signal inputted to the optical level control apparatus 10₃ is the optical burst signal taking the shape depicted in FIG. 17A, the CPU 26 is notified of the occurrence of the input power-over, however, the optical burst signal taking the shape depicted in FIG. 17A is a signal that is not normally processed by the OLT 40 even when adjusting the elimination time Te. Then, if the relationship of $Te=Te_0$ is established when notifying of the occurrence of the input power-over, it follows that the optical burst signal inputted to the optical level control apparatus 10₃ is the optical burst signal taking the shape depicted in FIG. 17A. Therefore, if the relationship of $Te=Te_0$ is established when notifying of the occurrence of the input power-over (step S354; YES), the OLT 40 is contrived to receive the notification of the system error.

Furthermore, the determination as to whether or not there is the notification of the occurrence of the reception signal error after the value of the adjusted Flag has become "1", intends determining whether or not the optical burst signal inputted to the optical level control apparatus 10₃ is the optical burst signal taking a shape depicted in FIG. 17D. Namely, the processes in steps S352-S356 are the processes having a possibility that the value of the adjusted Flag is changed to "1" as the case may be also when the optical burst signal inputted to the optical level control apparatus 10₃ is the optical burst signal taking the shape depicted in FIG. 17D. However, the optical burst signal taking the shape depicted in FIG. 17D is a signal that is not normally processed by the OLT 40 even when adjusting the elimination time Te. Then, the determination as to whether or not the optical burst signal inputted to the optical level control apparatus 10₃ is the optical burst signal taking the shape depicted in FIG. 17D can be made by determining whether the reception signal error occurs or not. Therefore, it is determined whether or not there is the notification of the occurrence of the reception signal error after the value of the adjusted Flag has become "1", and, if notified of the occurrence of the reception signal error, the OLT 40 is contrived to receive the notification of the system error.

As described so far, similarly to the optical level control apparatus 10₂, the optical level control apparatus 10₃ has the function to convert the variety of optical burst signals having the different lengths of laser ON time period into the optical burst signals, with the fields overlapped with the optical surges being eliminated, which can be received by the OLT 40 without any problem. Therefore, the use of the optical level control apparatus 10₃ enables the realization of the optical communication system having the configuration of adding the optical fiber amplifier to the 10G-EPON in such a form that the OLT 40 is hard to get failed and deteriorated due to the optical burst signal overlapped with the optical surge.

Further, the optical level control apparatus 10₃ is the apparatus configured to convert the inputted optical burst signal into a signal being normally receivable by the OLT 40 and having a short period of elimination time (a value given by "Te initial value–n·$\Delta$Te" (where "n" is the integer) is the smallest value) (see FIG. 23) and to output the thus-converted signal.

Namely, the optical burst signal with the optical surge being hardly superposed on up to the body field even when amplified by the FA 35, is output from the optical level control apparatus 10₃. Accordingly, it follows that the optical level control apparatus 10₃ is the apparatus that can be used in the same form (FIGS. 13A and 13B) as the optical level control apparatus 10₂ and also in the form illustrated in FIG. 24.

Modified Embodiment

Figure 24:
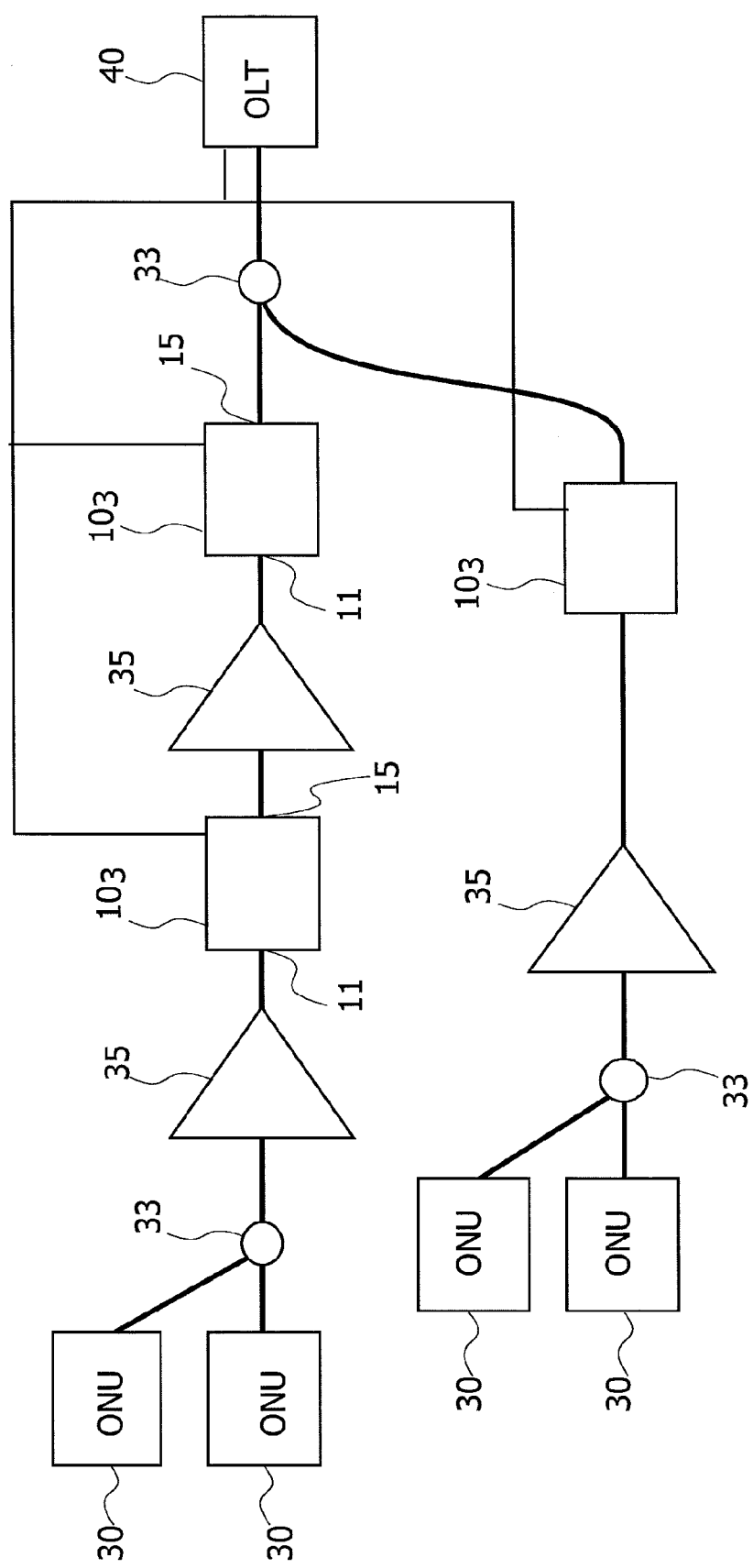
FIG. 24 is an explanatory diagram of an example of a configuration of the optical communication system that can be built up by use of the optical level control apparatus according to the third embodiment.

The optical level control apparatus (10, 10₂, 10₃) according to the respective embodiments can be modified in a variety of forms. For example, as schematically illustrated in FIG. 24, each of the optical level control apparatus 10₂ and the optical level control apparatus 10₃ can be modified into an apparatus (i.e., an amplification apparatus) configured to insert the FA 35 in between the SOA 14 and the optical coupler 12. Moreover, the optical level control apparatus 10 according to the first embodiment can be modified into the amplification apparatus configured to insert the FA 35 in between the SOA 14 and the optical coupler 12. Note that the optical level control apparatus is modified into the amplification apparatus used in a state of providing none of the FA 35 at the front stage, in which case the optical filter 16 can be removed.

If contrived to stand by for an elapse of "Te–α" (a is delay time due to the delay line 13) in the process in step S102, S203 or S303, the optical level control apparatus 10, 10₂ or 10₃ can be modified into an apparatus not having the delay line 13. If modified in such a manner, however, it follows that the supply of the drive current to the SOA 14 is not stopped immediately after an additional completion of the optical burst signal, though the optical level control apparatus can be manufactured in a compact configuration at a low cost. It is therefore preferable to provide the delay line 13 if desired to acquire the optical level control apparatus exhibiting low power consumption.

The optical level control apparatus according to each embodiment can be also modified into an apparatus configured so that the amplification factor of the SOA 14 is not 0 dB when driven. Further, the optical level control apparatus according to each embodiment can be also modified into an apparatus configured to employ a ferroelectric optical switch (e.g., a PLZT (Plomb Lanthanum Zirconate Titanate) optical switch) and an optical switch for mechanically controlling a mirror position in place of the SOA 14.

Figure 25:
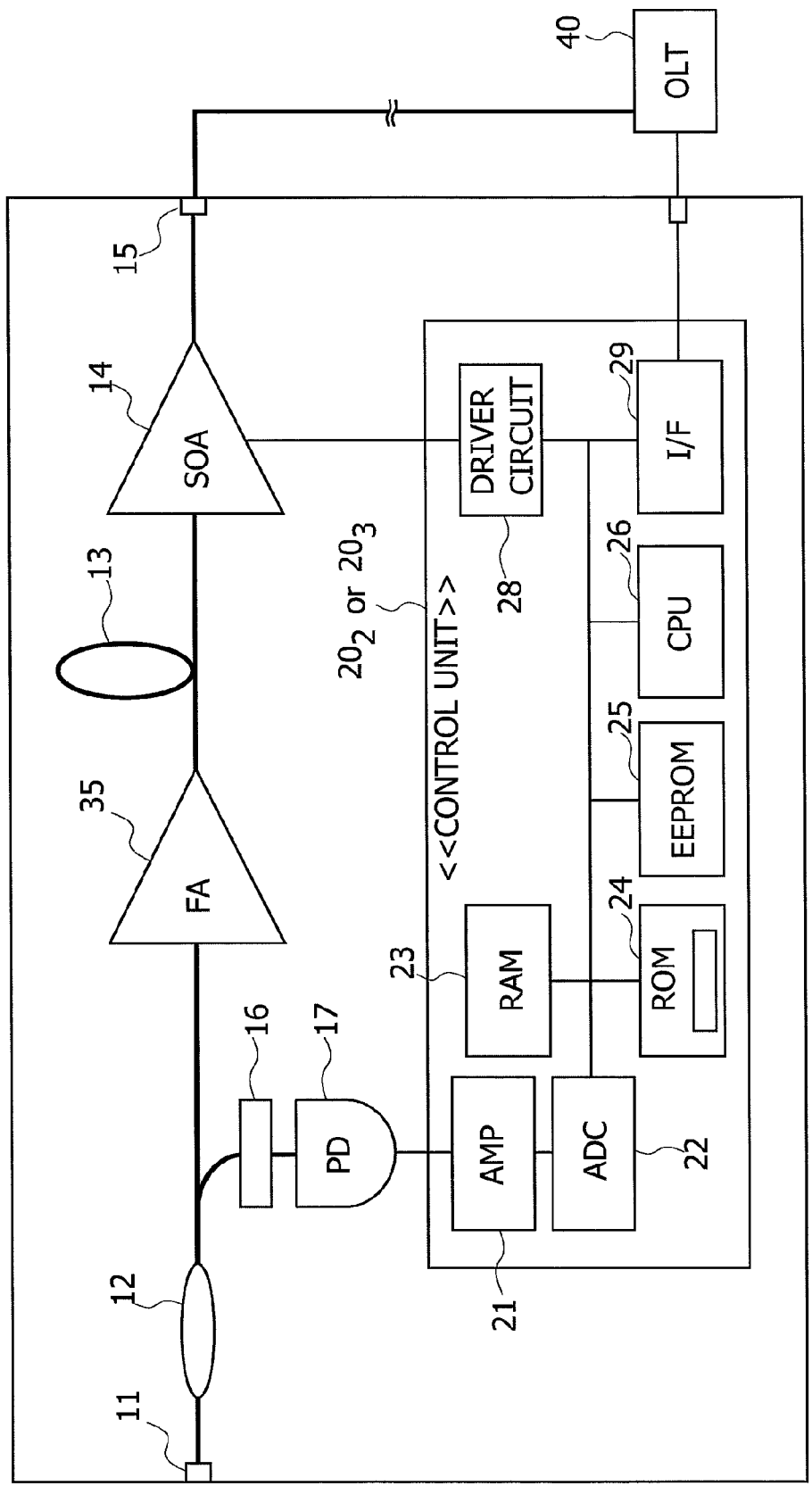
FIG. 25 is an explanatory diagram of a modified example of the optical level control apparatuses according to the second and third embodiments.
Figure 26:
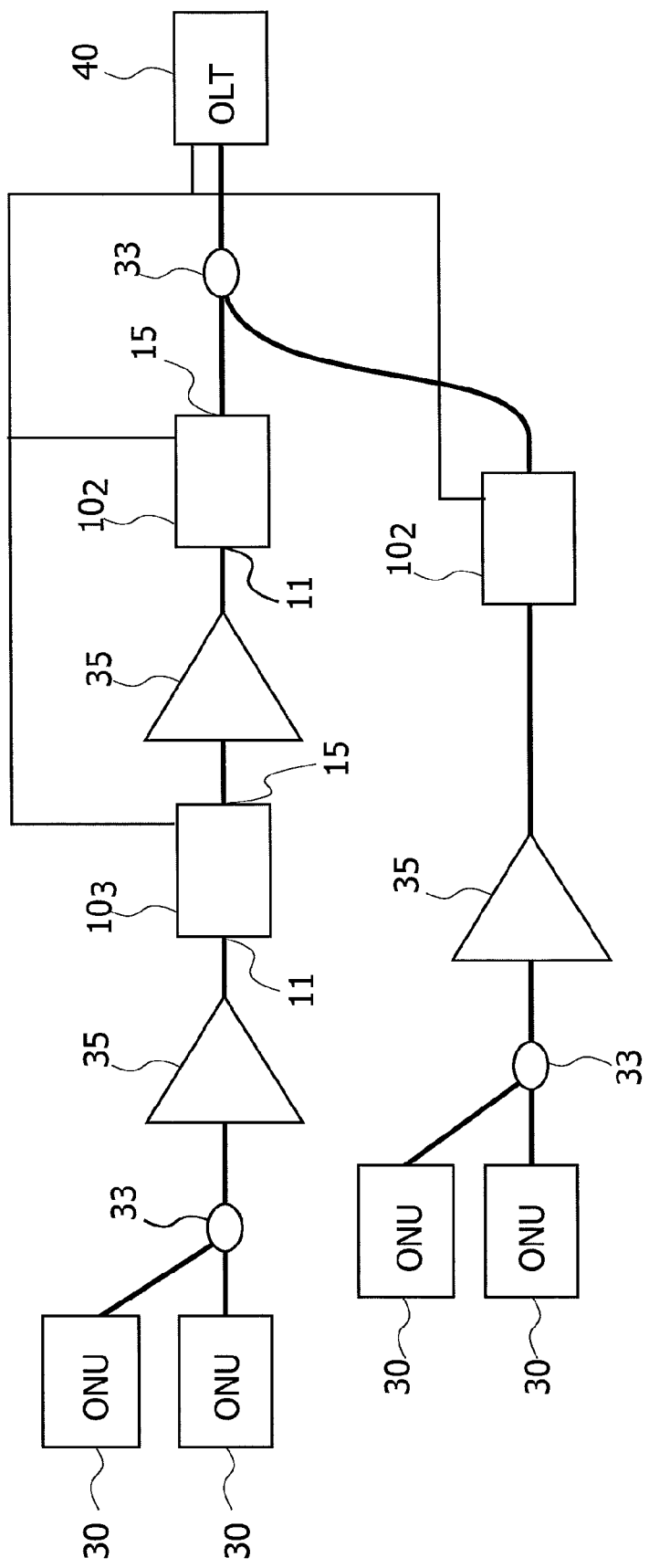
FIG. 26 is an explanatory diagram of an example of using the optical level control apparatuses according to the second and third embodiments.

The optical communication system as illustrated in FIG. 25 can be built up by use of the optical level control apparatus 10₂ and the optical level control apparatus 10₃. Namely, as described above, the optical level control apparatus 10₃ is the apparatus configured to convert the inputted optical burst signal into the optical burst signal with the optical surge being hardly superposed on up to the body field even when amplified by the FA 35 and to output the thus converted optical burst signal. Moreover, the optical level control apparatus 10₂ is the apparatus configured to convert the inputted optical burst signal into the optical burst signal not causing the reception signal error in the OLT 40 and having the short continuation time and to output the thus converted signal. Accordingly, when using the optical level control apparatuses 10₂ and 10₃ as depicted in FIG. 26, it follows that it is feasible to build up the optical communication system capable of transmitting the information to a distance requiring the amplification to be performed twice and narrowing down the interval between the post-multiplexing optical burst signals inputted to the OLT 40.

Furthermore, as illustrated in FIG. 27, the optical level control apparatus 10 etc can be also inserted in between a WDM coupler 42 in the OLT 40 and a reception system 43 for converting the optical burst signal inputted to an input/output port 41 and demultiplexed by the WDM coupler 42 into the digital data. In other words, a reception/transmission apparatus of the optical burst signal can be realized by use of the optical level control apparatuses 10, 10$_2$, 10$_3$.

Each optical level control apparatus can be also used for the optical communication system configured not to add the FA 35 to a GE-PON/10G-EPON system (which is, e.g., an optical communication system different from the GE-PON/10G-EPON system in terms of a downlink signal transmission method). Moreover, it is also feasible to build up the optical communication system capable of designating the laser ON time period shared between the ONUs 30 by using the modified optical level control apparatuses 10$_2$, 10$_3$ modified into the apparatuses configured to adjust the elimination time Te without identifying the sender.

Furthermore, as a matter of course, each of the control unit 20, 20$_2$, 20$_3$ in the respective optical level control apparatuses may be a board mounted with units (not executing the program) exclusive of the CPU 26, a board mounted with the CPU 26 and the ADC 22, and so on.

According to the technology of the disclosure, the optical surge can be restrained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical level control apparatus comprising:
an input port configured to receive input light, the light being amplified by an optical fiber amplifier;
an output port;
an optical device configured to assume a state of outputting light that was input to the input port from the output port and a state of not outputting the light that was input to the input port from the output port;
a detector configured to detect an intensity of the light input at the input port; and
a control unit configured to detect an input of an optical burst signal to the input port on the basis of a result of detecting the intensity of the light by the detector and to control the optical device so that the optical burst signal, in which a field extending up to an elapse of a first period of time equal to or shorter than a laser ON time period defined by a period of time from a head of the optical burst signal with its input being detected until starting modulation of the optical burst signal is eliminated, is output from the output port, the first period of time being for eliminating an optical surge overlapped with the optical burst signal,
wherein a reception device configured to receive the optical signal output from the output port notifies the control unit that input over-power occurs when the intensity of the received optical burst signal is stronger than a fixed intensity, the reception device being arranged outside the optical level control apparatus, and
the control unit adjusts the first period of time to a shortest period of time on the basis of whether or not input over-power occurs, wherein the shortest period of time is a period during which the reception device arranged outside the optical level control apparatus ceases notification of the input over-power, and wherein the shortest period of time is selected from among a plurality of periods of time that are selectable by the control unit,
wherein the reception device configured to receive the optical signal output from the output port notifies the control unit that a reception signal error occurs when the received optical burst signal is not converted into digital data, and
the control unit adjusts the first period of time to a longest period of time during which notification of the reception signal error from the reception device ceases among the plurality of periods of time selectable by the control unit on the basis of whether the notification of the occurrence of the reception signal error is given or not, the reception device being arranged outside the optical level control apparatus.

2. The optical level control apparatus according to claim 1, wherein the control unit controls the optical device to distinguish a sender device of each optical burst signal input to the input port on the basis of information indicating timing when each of a plurality of sender devices transmits the optical burst signal, to manage and adjust the first period of time per distinguished sender device, and to output, from the output port, the optical burst signal in which the field extending up to the elapse of the first period of time being adjusted underway or having been adjusted from the head of the optical burst signal with its input being detected with respect to the sender device of the optical burst signal is eliminated.

3. The optical level control apparatus according to claim 1, wherein the optical device is controlled in a first state of outputting the light input to the input port from the output port and in a second state of not outputting the light input to the input port from the output port, and
the control unit controls the optical device to operate in the first state when the first period of time elapses since detecting the input of the optical burst signal to the input port on the basis of the result of detecting the intensity of the light by the detector, and controls the optical device to operate in the second state when detecting completion of inputting the optical burst signal to the input port on the basis of the result of detecting the intensity of the light by the detector.

4. The optical level control apparatus according to claim 1, further comprising a delay element configured to get the optical device to input a field extending from the head up to after the elapse of the first period of time in the optical burst signal input to the input port when the optical device starts operating in the first state under the control of the control unit.

5. An optical reception apparatus comprising:
a reception system configured to convert an optical burst signal into an electric signal; and
an optical level control system, the optical level control system comprising:

an input port configured to receive input light, the light being amplified by an optical fiber amplifier;

an optical device configured to assume a state of supplying light that was input to the input port to the reception system and a state of not supplying the light that was input to the input port to the reception system;

a detector configured to detect an intensity of the light that was input to the input port; and a control unit configured to detect an input of the optical burst signal to the input port on the basis of a result of detecting the intensity of the light by the detector and to control the optical device so that the optical burst signal, in which a field extending up to an elapse of a first period of time equal to or shorter than a laser ON time period defined by a period of time from a head of the optical burst signal with its input being detected until starting modulation of the optical burst signal is eliminated, is supplied to the reception system, the first period of time being for eliminating an optical surge overlapped with the optical burst signal, wherein the reception system notifies the control unit that input over-power occurs when the intensity of the received optical burst signal is stronger than a fixed intensity, the reception system being arranged outside the optical level control system, and the control unit adjusts the first period of time to a shortest period of time on the basis of whether or not input over-power occurs, wherein the shortest period of time is a period during which the reception system arranged outside the optical level control system ceases notification of the input over-power, and wherein the shortest period of time is selected from among a plurality of periods of time that are selectable by the control unit, wherein the reception system notifies the control unit that a reception signal error occurs when the received optical burst signal is not converted into digital data, and the control unit adjusts the first period of time to a longest period of time during which notification of the reception signal error from the reception system ceases among the plurality of periods of time selectable by the control unit on the basis of whether the notification of the occurrence of the reception signal error is given or not, the reception system being arranged outside the optical level control apparatus.

6. The optical level control apparatus according to claim 1, further comprising an optical fiber amplifier configured to amplify the light inputted to the input port and to supply the amplified light to the optical device.

* * * * *